US009286757B2

(12) United States Patent
Guinn et al.

(10) Patent No.: US 9,286,757 B2
(45) Date of Patent: Mar. 15, 2016

(54) WAGERING GAME WITH DYNAMIC PRIZE OFFERING

(71) Applicant: WMS Gaming, Inc., Waukegan, IL (US)

(72) Inventors: Andrew C. Guinn, Chicago, IL (US); Michael W. Mastropietro, Chicago, IL (US); Aaron J. Schurman, Cedar Falls, IA (US); Bryan J. VanDaele, Cedar Falls, IA (US)

(73) Assignee: Bally Gaming, Inc., Las Vegas, NV (US)

( * ) Notice: Subject to any disclaimer, the term of this patent is extended or adjusted under 35 U.S.C. 154(b) by 25 days.

(21) Appl. No.: 13/829,685

(22) Filed: Mar. 14, 2013

(65) Prior Publication Data

US 2014/0274308 A1 Sep. 18, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3244* (2013.01); *G07F 17/3267* (2013.01)

(58) Field of Classification Search

CPC ......................... G07F 17/3262; G07F 17/3267

See application file for complete search history.

(56) References Cited

U.S. PATENT DOCUMENTS

| | | | | |
|---|---|---|---|---|
| 4,837,728 | A | | 6/1989 | Barrie et al. |
| 5,231,568 | A | | 7/1993 | Cohen et al. |
| 5,373,440 | A | | 12/1994 | Cohen et al. |
| 5,397,125 | A | | 3/1995 | Adams |
| 5,564,700 | A | | 10/1996 | Celona |
| 5,707,285 | A | | 1/1998 | Place et al. |
| 5,941,772 | A | | 8/1999 | Paige |
| 5,947,820 | A | | 9/1999 | Morro et al. |
| 6,015,344 | A | * | 1/2000 | Kelly et al. ..................... 463/16 |
| 6,068,553 | A | | 5/2000 | Parker |
| 6,113,098 | A | | 9/2000 | Adams |
| 6,497,408 | B1 | * | 12/2002 | Walker et al. .............. 273/138.1 |
| 6,523,824 | B1 | | 2/2003 | Colapinto et al. |
| 6,540,609 | B1 | | 4/2003 | Paige |
| 6,609,970 | B1 | | 8/2003 | Luciano, Jr. |
| 6,648,761 | B1 | | 11/2003 | Izawa et al. |
| 6,843,720 | B2 | | 1/2005 | Luciano et al. |
| 6,875,107 | B1 | | 4/2005 | Luciano, Jr. |
| 6,890,256 | B2 | | 5/2005 | Walker et al. |
| 6,899,626 | B1 | | 5/2005 | Luciano et al. |
| 7,008,320 | B2 | | 3/2006 | Rowe et al. |
| 7,008,321 | B2 | | 3/2006 | Rowe et al. |
| 7,025,674 | B2 | | 4/2006 | Adams et al. |
| 7,320,641 | B2 | | 1/2008 | Luciano, Jr. |
| 7,455,586 | B2 | | 11/2008 | Nguyen et al. |
| 7,485,040 | B2 | | 2/2009 | Walker et al. |
| 7,862,420 | B2 | | 1/2011 | Peterson et al. |

(Continued)

*Primary Examiner* — Kevin Y Kim

(74) *Attorney, Agent, or Firm* — DeLizio Law, PLLC

(57) ABSTRACT

A wagering game system and its operations are described herein. In some embodiments, the operations can include detecting a trigger for a bonus game associated with presentation of a wagering game. The operations can further include, in response to the trigger, providing, for presentation, an option to select either a prize or play of the bonus game. The operations can further include detecting a selection of either the prize or the play of the bonus game, and providing either the prize or the play of the bonus game based on the selection.

35 Claims, 10 Drawing Sheets

(56) References Cited

U.S. PATENT DOCUMENTS

| | | | | |
|---|---|---|---|---|
| 7,909,694 | B2 * | 3/2011 | Schugar | 463/25 |
| 7,997,972 | B2 | 8/2011 | Nguyen et al. | |
| 8,209,221 | B2 | 6/2012 | Schwartz et al. | |
| 2003/0036427 | A1 | 2/2003 | Brandstetter et al. | |
| 2003/0060256 | A1 | 3/2003 | Joshi | |
| 2004/0192429 | A1 | 9/2004 | Moody | |
| 2005/0079908 | A1 * | 4/2005 | Pacey | 463/20 |
| 2006/0194631 | A1 | 8/2006 | Rowe et al. | |
| 2007/0087797 | A1 * | 4/2007 | Van Luchene | 463/1 |
| 2008/0311981 | A1 * | 12/2008 | Schugar | 463/26 |
| 2009/0042634 | A1 | 2/2009 | Cannon et al. | |

* cited by examiner

WAGERING GAME WITH DYNAMIC PRIZE OFFERING

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

TECHNICAL FIELD

Embodiments of the inventive subject matter relate generally to wagering game systems and networks that, more particularly, present prizes in wagering games.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

Traditionally, wagering game machines have been confined to physical buildings, like casinos (e.g., resort casinos, road-side casinos, etc.). The casinos are located in specific geographic locations that are authorized to present wagering games to casino patrons. However, with the proliferation of interest and use of the Internet, shrewd wagering game manufacturers have recognized that a global public network, such as the Internet, can reach to various locations of the world that have been authorized to present wagering games. Any individual with a personal computing device (e.g., a personal computer, a laptop, a personal digital assistant, a smartphone, etc.) can connect to the Internet and play wagering games. As a result, wagering game manufacturers, casino operators, and online game providers are constantly in need of innovative concepts that can make the online gaming industry appealing and profitable.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into five sections. The first section provides an introduction to embodiments. The second section describes example operations performed by some embodiments while the third section describes additional example embodiments. The fourth section describes example operating environments while the fifth section presents some general comments.

Introduction

This section provides an introduction to some embodiments.

Wagering games are expanding in popularity. Many wagering game enthusiasts are demanding greater access to wagering games and content related to wagering games. As stated previously, some wagering game companies have created online wagering game websites that provide a way for wagering game enthusiasts to play wagering games while connected to the Internet (e.g., via a web-browser). Some online wagering game websites provide various features, such as social networks and social networking functionality. Social networks allow wagering game players ("players") to create social network user accounts with one or more unique identifiers that represent an online persona. These online personas add to the fun of belonging to a social network. Wagering game manufacturers, casino operators, and others in the wagering game industry are continuously desirous of new and innovative ideas related to traditional gaming venues, online gaming venues, social gaming, and the like.

Some embodiments of the inventive subject matter disclose a wagering game system ("system") that can trigger a bonus game during play of a wagering game and offer a choice, or option, to either play the bonus game or select an instant prize instead of playing the bonus game. If the player selects to play the bonus game, the system provides a potential of winning a bonus award or not winning the bonus award depending on the play in the bonus game. If, however, the player selects the instant prize, the player can receive the prize instantly without having to play the bonus game.

Figure 1:
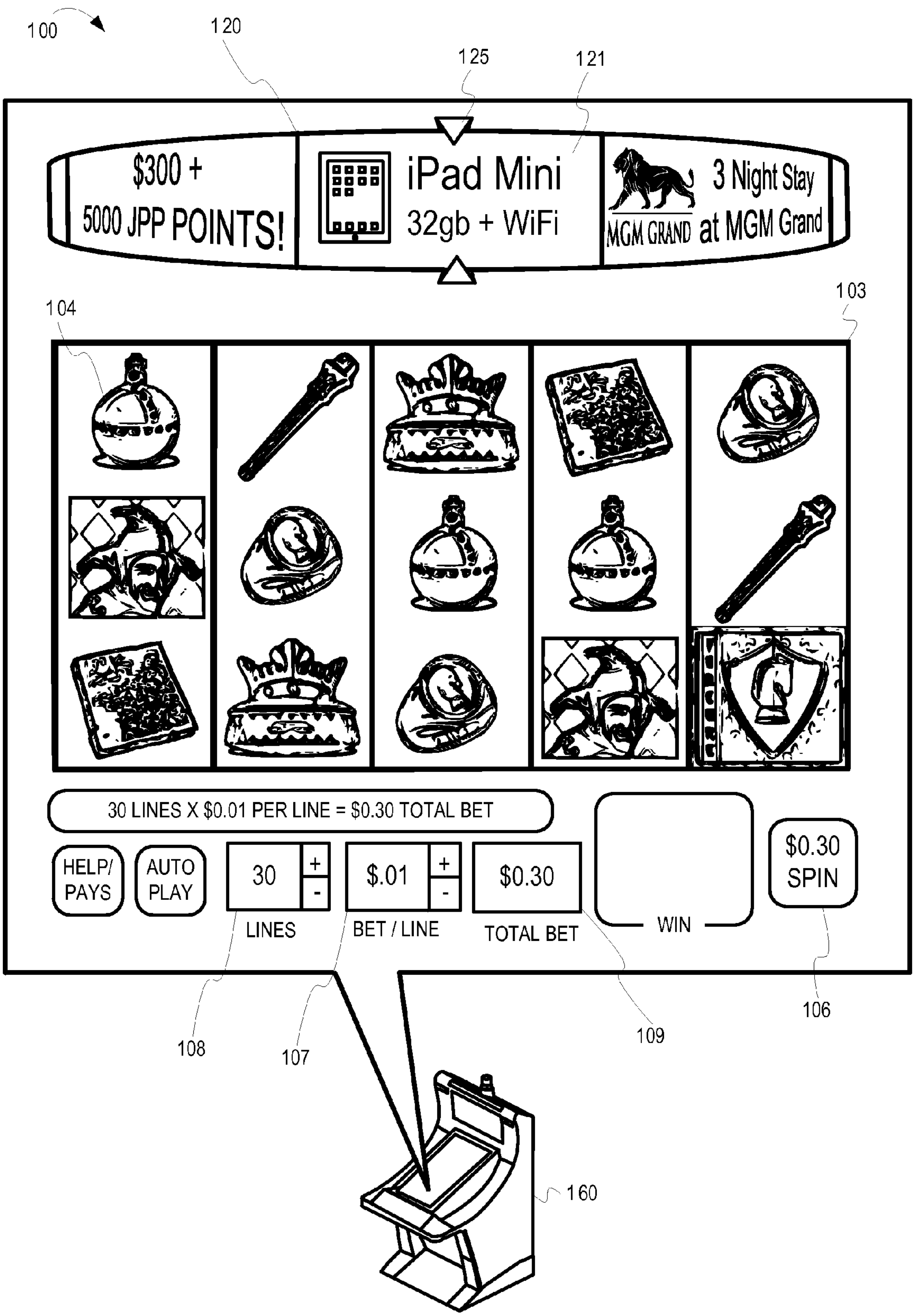
FIGS. 1-2 are illustrations of presenting a prize option in a wagering game, according to some embodiments.
Figure 2:
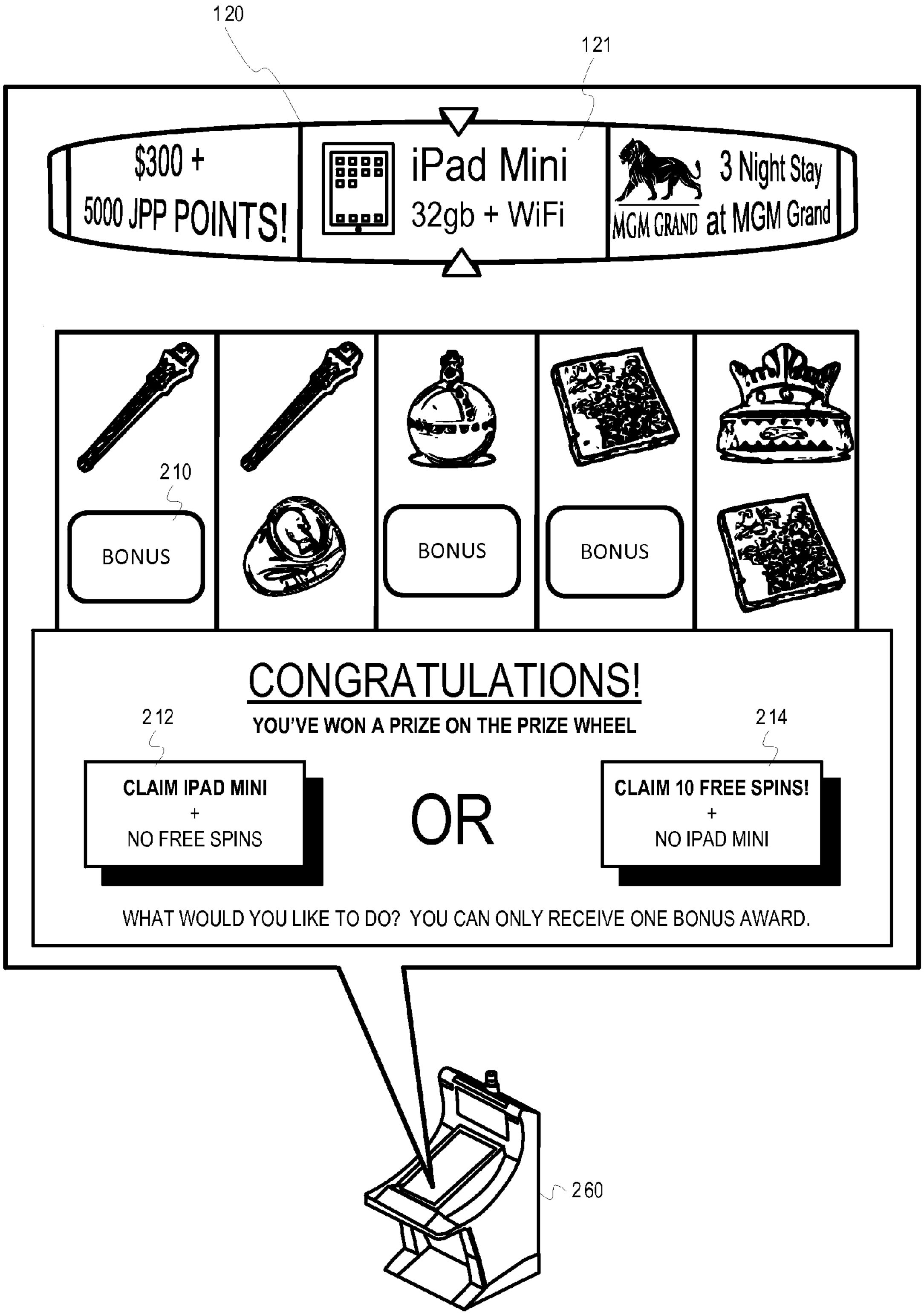

FIGS. 1 and 2 are conceptual diagrams that illustrate an example of presenting a prize option in a wagering game, according to some embodiments.

In FIG. 1 a wagering game system ("system") 100 includes a wagering game machine 160 configured to present wagering game content. In some embodiments, the system 100 includes additional devices, such as a wagering game server, network devices, etc. For example, the wagering game machine 160 can store and process wagering game content, receive content from and communicate data with a wagering game server, communicate with peripheral devices, integrate with environmental devices, etc. The wagering game machine 160 presents primary wagering game content 103 ("primary content"). The primary content 103 includes a slot game in which a wagering game player ("player") can make wagers on a random outcome of the slot game. For example, a player can wager on a random presentation of slot symbols 104 that appear to spin on slot reels 105. The wagering game provides an activation control (e.g., a "spin" button 106) which a player can use to spin the reels 105. The wagering game also provides wagering controls that a player can use to set a betting level (e.g., an amount to bet for each spin of the slot reels 105). For example, the wagering game provides a bet control 108 and a line control 107. The bet control 108 sets a specific bet value (e.g., in credits, dollars, pounds, virtual currency, points, etc.). The line control 107 specifies a number of pay lines, or ways that the symbols 104 can line up to potentially produce a winning result. A total bet meter 109 specifies the total bet amount that the player will spend for each spin (e.g., the total bet amount equals the value specified in the bet control 108 times the value specified in the line control 107).

The wagering game machine 160 is also configured to present secondary content, such as a bonus game. For example, the wagering game (sometimes referred to as a "base game") can trigger a bonus game either based on a specific configuration of the symbols 104 or based on a mystery or hidden event independent of the displayed symbols 104. For example, as illustrated in FIG. 2, when a specific number of symbols appear in a specific configuration (e.g., three "bonus" symbols 210 appear in an eligible pay line), a bonus game is triggered. However, according to some embodiments, the wagering game machine 160 does not immediately present play of the bonus game. Instead, the wagering game machine 160 presents an option to select a prize 121 instead of playing the bonus game. For example, the wagering game machine 160 presents a first button 212 and a second button 214. The second button 214 can be used to select play of the bonus game and not the prize 121. The first button 212, however, can be used to select the prize 121 and not play of the bonus game.

The prize 121 can be specified in a prize indicator prior to the bonus game being triggered. For example, as illustrated in FIG. 1, the prize indicator can be a prize wheel 120 that the wagering game machine 160 presents in connection with the primary content 103. The prize wheel 120 includes various prize items, one or more of which can be awarded when the bonus game is triggered. The prize items can include physical products, services, cash, free spins on another primary game, virtual currency for a social gaming website, hotel accommodations, etc. In some embodiments, the system 100 can provide a user interface through which a game operator can set up what prize items are included in the prize wheel 120.

While the base game plays, the prize wheel 120 can cycle through the prize items with one of the prizes being highlighted such as via the highlight element 125 and/or some other highlight effect or feature (e.g., a sparkle, a glow, an outline, a 3D effect, a fish-eye or magnification effect, etc.). When the bonus game is triggered (as in FIG. 2), the prize item that is highlighted is selected as being the prize that the player can select instead of playing the bonus game.

In some examples, the prizes specified in the prize wheel 120 are not funded by the wagers made via primary content 103. For example, the prizes may be funded by a marketing account. In other examples, however, the prizes on the prize wheel 120 are funded by wagers made via the primary content 103. The value of any prize awarded can be associated with math functions of the base game and/or the bonus game (e.g., expected value, or expected payout, of the bonus can be computed using a value of the prize awarded, or vice versa a value for the prize can be computed used an average expected payout for the bonus game).

Further, some embodiments of the inventive subject matter describe examples of wagering game with a prize option in a network wagering venue (e.g., an online casino, a wagering game website, a wagering network, etc.) using a communication network. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have user accounts that subscribe to specific services, such as account-based wagering systems (e.g., account-based wagering game websites, account-based casino networks, etc.).

Further, for purposes of the present detailed description, a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Furthermore, for purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Although FIGS. 1 and 2 describe some embodiments, the following sections describe many other features and embodiments.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
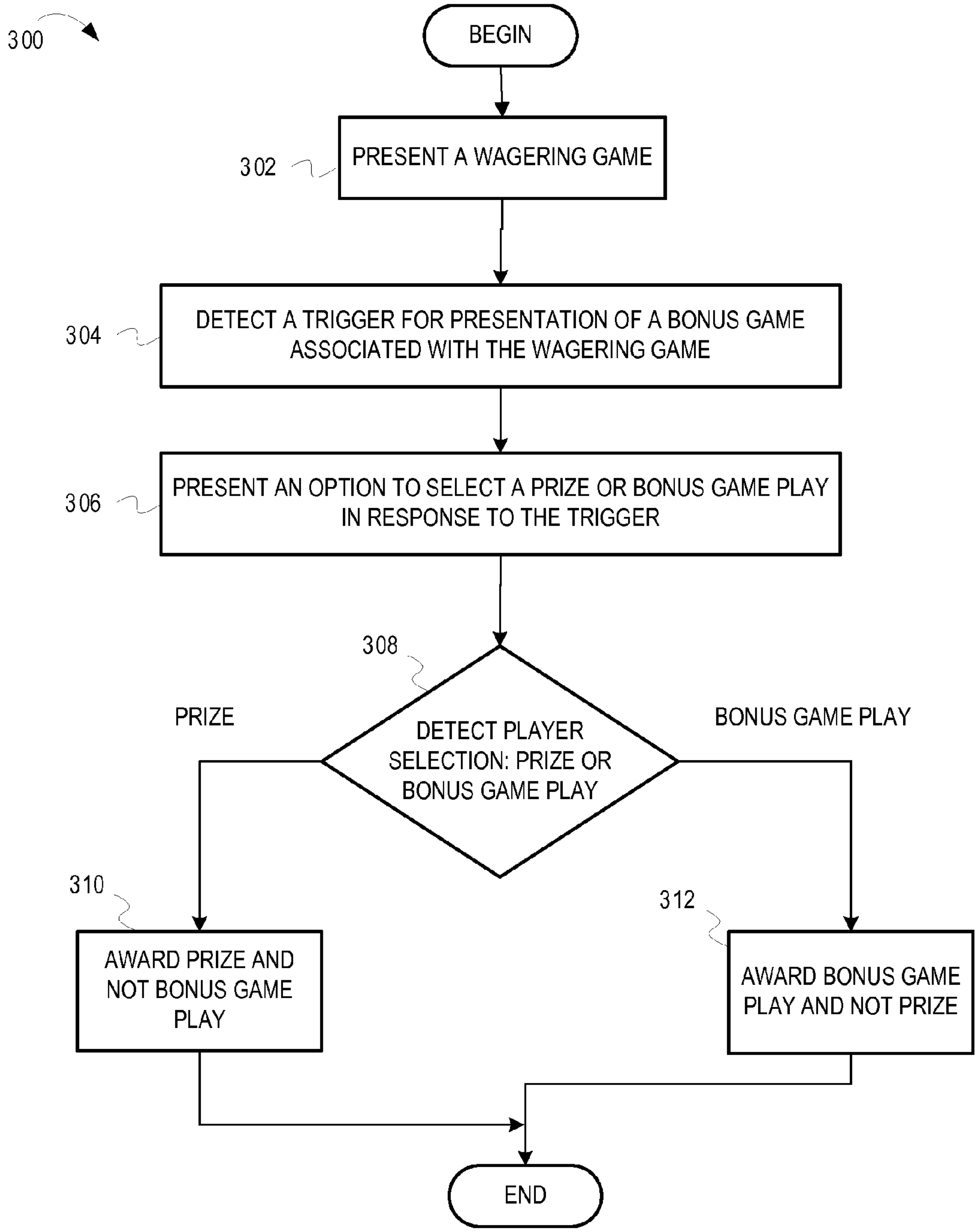
FIG. 3 is a flow diagram 300 illustrating presenting options for selecting either a prize or bonus game play for a wagering game, according to some embodiments.

FIG. 3 is a flow diagram ("flow") 300 illustrating presenting options for selecting either a prize or bonus game play for a wagering game, according to some embodiments. FIGS. 4, 5, 6, and 7 are conceptual diagrams that help illustrate the flow of FIG. 3, according to some embodiments. This description will present FIG. 3 in concert with FIGS. 4, 5, 6 and 7. In FIG. 3, the flow 300 begins at processing block 302, where a wagering game system ("system") presents a wagering game. In some embodiments, the system presents a wagering game via a wagering game machine, as described in FIGS. 1-2. However, in other embodiments, the system presents a wagering game via other devices, such as personal computing devices, mobile devices, tablet computers, desktop computers, laptops, televisions, etc.

The flow 300 continues at processing block 304, where the system detects a trigger for presentation of a bonus game associated with the wagering game. FIGS. 1-2 illustrate an example of a bonus game triggered by occurrence of specific events in a primary wagering game. Bonus games can be integrated with the primary wagering game (e.g., pay out bonus awards funded by the primary wagering game, factor into an overall expected value for a wagering game, share a common theme with a primary wagering game, etc.). Thus, the bonus game can be associated with the primary wagering game in functionality, features, math, etc. In other embodiments, the bonus game may be separate, or independent, from the primary wagering game with separate components, files, libraries, themes, objectives, funding, payouts, math functions, etc. Events separate from the primary wagering game may trigger the bonus game, such as mystery events, events from ongoing wagering games or promotions, environmental events, events related to other players or other gaming devices, etc. When the bonus game is triggered, however, the primary wagering game pauses its normal functions until the bonus game has completed its performance. Thus, the bonus game can be associated with the primary wagering game in timing. In some embodiments, winnings or awards from the bonus game can be stored in a session balance shared with the primary wagering game and/or stored in a player account used to play the primary wagering game. Thus, the bonus game can be associated with the primary game via a player account.

The flow 300 continues at processing block 306, where the system presents an option to select a prize or bonus game play in response to the trigger for the bonus game occurring during play of the primary wagering game.

In some embodiments, the system presents an indication of the prize being offered prior to presenting the option to select the prize. For example, the system can present an indication of the prize (or prizes) before a player logs on to a game (e.g., in a communication sent to the player, during an attract sequence on a wagering game machine, as an advertisement for the wagering game, etc.). In another example, the system can present an indication of the prize after initiating a gaming session, but before the bonus game is triggered (as illustrated in FIG. 1). In another example, the system can present an indication of the prize after, or concurrently with, the trigger for the bonus game. For example, instead of presenting the prize wheel 120 while the wagering game is being played, the system could instead present the prize wheel 120 at about the same time that the bonus symbols 210 appear (as in FIG. 2).

In some embodiments, the system presents a prize listing (e.g., a prize wheel) during play of a wagering game. In some embodiments, the system can cycle through the prize items in the prize listing, showing only some of the prize items for a period of time before showing others of the prize items.

In some embodiments, the prizes offered in the prize listing can change when a player changes their betting level (e.g., when a player chooses to bet max bet, when a player chooses to play the max number of lines for a given denomination, when the player increases the denomination, etc.). In some embodiments, the system can cycle through prize groupings or prize levels (e.g., cycle through the prizes at a current betting level, cycle through all possible prizes for all betting levels, or some combination).

In some embodiments, the system can present prizes of different values. In one example, the system can set or adjust value of a prize based on a player's betting level or betting history. For example, the system can set or adjust values of a prize based on a number of games played, a bet denomination for a wagering game, an average bet amount per play, an average amount of lines bet on per play, a quantity or value of betting over time, etc. The more a player bets (e.g., over time, for higher amounts of credits per bet, or for higher denominations of bets), then the system can increase a quantity or value of the prize being offered (e.g., a player who has bet more over time is eligible for a higher prize). In some embodiments, the system can utilize different prize listings associated with different betting levels. Further, the system can limit a number of bet levels that are eligible to attain a prize. For example, only a max bet, or a few high betting levels could be eligible as opposed to all betting levels.

In some examples, the value of prize can be a market price of a prize item. For instance, the value of the prize can be a manufacturer's suggested retail price (MSRP), a wholesale price, or some other type of actual or suggested cost for the prize. The system can monitor the cost (e.g., MSRP) online and update the prize values based on any changes to the cost.

In some embodiments, the system can provide a first option to affirmatively select the prize offered and not present content for the bonus game used to play the bonus game (e.g., the first button 212 in FIG. 2). The system can also provide a second option to affirmatively select the bonus game play and not receive the award (e.g., the second button 214 in FIG. 2). In another embodiment, however, instead of presenting separate options that prompt the player to either affirmatively select the prize or affirmatively select the bonus game play, the system could present separate options that prompt the player to either affirmatively select the prize or affirmatively reject the prize (or vice versa, affirmatively accept and/or reject the bonus game play). For example, the system can present a question that prompts, "Would you like a prize instead of playing the bonus game?" along with a "yes" option and "no" option. If the player selects the "yes" option then the system provides the prize and not the bonus game play. If the player selects the "no" option, then the system rejects the prize and provides the bonus game play.

The flow 300 continues at processing block 308, where the system determines whether the option for the prize was selected or whether the option for the bonus game play was selected. For example, in FIG. 2, the system 100 detects whether a user input selects the button 212 or the button 214.

If the system detects that the option for the bonus game play is selected, then, as shown at processing block 312, the system does not award the prize but does allow play of the bonus game. For instance, in FIG. 2, if a player had selected button 214, the system 100 would subsequently present a bonus game feature where a player can make ten free spins. Any awards or winnings won during the ten free spins would be added to a player's game account or to a session balance for the primary wagering game.

If, however, the system detects that the option for the prize is selected, then, as shown at processing block 310, the system awards the prize and does not award bonus game play. For instance, the system can indicate in a player's gaming account that the player selected the prize, and communicate the selection to a prize redemption service (e.g., a redemption kiosk at a casino, a shipping service that ships the prize to a home address, etc.). The system can then return to an idle state for the wagering game to await a player's next wager.

In some embodiments, the funding for the prize can come from the wagering game or from sources outside the wagering game. For example, the prize can be awarded using funds from a marketing account independent from funds attained via one or more wagers of the wagering game. If a prize is funded via a marketing account, when the player selects the prize instead playing the bonus game that was triggered, the system can consider the bonus game that was triggered as having a non-winning (e.g., zero) award value for that play of the bonus game. As a result, to compensate for the non-winning value, the system can later make additional pay outs in other ways (e.g., payout mystery prizes, trigger the bonus more often, provide extra multipliers in the bonus, etc.) representing a difference between the non-winning value and the average expected payout of the bonus game.

In other embodiments, the prize can be funded using funds from the wagering game. Consequently, the system can utilize a value for the prize as a payout for the given bonus game that was triggered. In some embodiments, the value of the prize is related to an expected average payout for the bonus game. In one example, the system can use a prize value that is substantially equivalent to an average expected payout for the bonus game based on a history of game play for the bonus game. The average expected payout is the average amount of a bonus award that can be expected to be paid out for any given round of a bonus game according to previously played rounds of the bonus game. The average expected payout for the bonus game can be computed by dividing (a) a total amount of bonus awards paid out over a long time for the bonus game by (b) the number of times the bonus game has been played. In some embodiments, for any given round of the bonus game, there can be some variability, or volatility, to the amount that could possibly be won, which could be greater than or less than the monetary value of the prize. In some embodiments, the value of the prize, once offered and/or accepted, does not change based on play of the bonus game. In some embodiments, the system can require the player to spin the prize wheel, and the prize wheel itself has an expected prize payout value that is equivalent to the bonus game's average payout (i.e., some prizes are worth more and some are worth less).

In some embodiments, the system can dynamically generate an expected payout for the round of the bonus game that was not played based on a value of the prize. For instance, the system can use a cost (e.g., MSRP) for the prize when computing an amount of payout for the round of the bonus game that was not played when the player instead selects the prize (e.g., for eventually paying out more during subsequent bonus games and/or for computing an updated average payout for the game).

In some instances, prize payouts over a given period may exceed an average expected bonus game payout, or vice versa. In some embodiments, the system can ensure that prize values and expected bonus payout are equivalent over time by doing certain things, some of which are described in the following paragraphs:

A) To be able to pay a higher prize value than an expected bonus game payout, the system can reduce the frequency of the bonus game and add up the average payout values for each time that the bonus game normally would have been presented but was not because of the decrease in frequency. Once the value of the addition of the average payouts value adds up to the value of the prize, then, the next time the bonus game is triggered, the system can present the option to play the bonus or select the prize.

B) In another example, if the bonus game occurs more/less frequently than average, or if the payout of the bonus is greater/less than the average, then the value for the prize can be adjusted up or down (e.g., a fewer/greater quantity of the prize is offered for the next payout, a different prize of greater/lesser value is offered for the next payout, etc.).

In some examples, the system can have prizes of differing values on a prize wheel so that the added amounts of the prizes average out to the average payout for the bonus game.

C) In some examples, the system can offer a prize value of the average payout value, wait to see what was won in the bonus game, and then offer a prize of equivalent value (or an upgrade to the previously offered prize).

D) In some examples, the system can use, or change, symbols on reels for the bonus game that affect the prize payout value.

E) In some examples, the system can give the player an option to add in an extra wager (from which prize values can be funded) so that the player can utilize a certain prize wheel, receive a higher prize value, exclude or add certain prizes, etc.

F) In some examples, the system can make up a difference in prize value to expected payout by using money from a marketing account.

Furthermore, in some embodiments, the system provides for an operator to configure settings of the wagering game based on the prize value. For example, because the prize value may be greater than, or less than, an average expected payout for the bonus game, the system can specify whether to alter the symbol pays, increase/decrease a minimum bet amount, increase/decrease a trigger frequency of the bonus game, etc. to compensate for the difference to ensure that the wagering game meets an average expected payout. If the operator wants players to win a prize more often, the system provides a mechanism for the operator to increase the bonus trigger frequency. If the operator wants a specific prize to be awarded which is greater in value than the average payout, the system provides a mechanism for the operator to configure the game so that the minimum bet amount is raised and/or to cause lower symbol pays, thus increasing the amount of wagers that can be utilized to compensate for the prize value being higher than an average expected payout.

Additional Example Embodiments

According to some embodiments, a wagering game system ("system") can provide various example devices, operations, etc., to offer prizes in wagering games. The following non-exhaustive list enumerates some possible embodiments.

Additional Options for Prize Offerings.

In some embodiments, the system can introduce an additional option to defer receiving the prize, (i.e., bank or save an equivalent value of the prize to be added to the next time the prize option comes up). The prize values that are banked can accumulate in a player's account as a form of secondary currency that can be used at a later time to attain greater prizes or to upgrade prizes (e.g., in a subsequent prize offering or after a wagering game session ends). In one example, by deferring the prize, the next time the prize offering occurs for the player, the prize offering (e.g., a prize wheel) can be a higher valued prize offering (e.g. the prize wheel has prizes with higher values than the previous prize wheel). In some embodiments, the system can store player preferences to automatically bank a prize or choose bonus game play if all of the offered prizes in an offering are not prizes that the player wants. The system can further prompt a player when a prize comes up that the player wants, then give the option to choose the prize.

Figure 4:
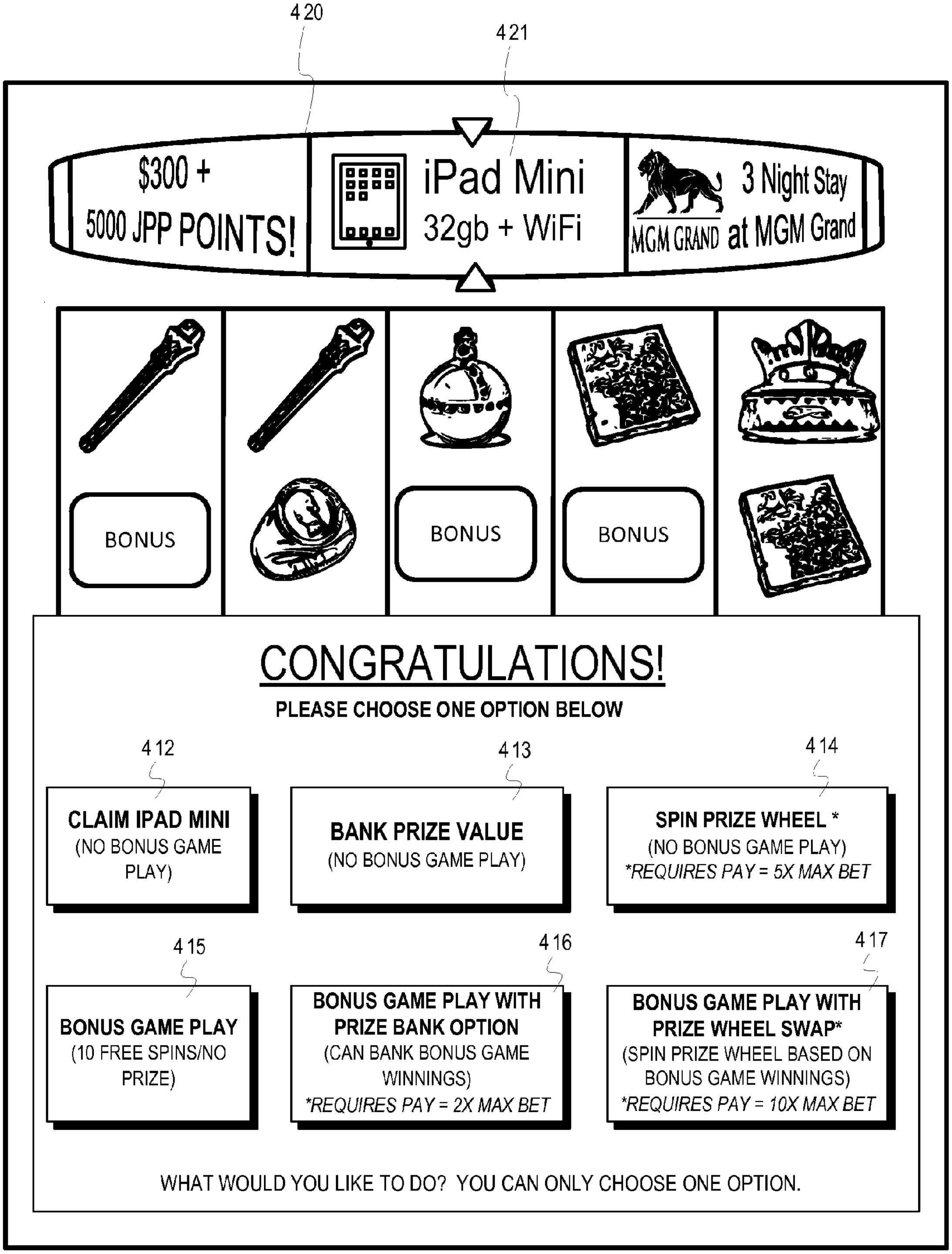
FIG. 4 is an illustration of presenting various options for a prize offering in a wagering game, according to some embodiments.

FIG. 4 illustrates an example of offering various options. A first option 412 can be to select the prize without playing the bonus game. A second option 413 can be to bank the prize value (as described above). A third option 414 can be to spin a prize wheel 420. By selecting the third option 414 a player may have a chance to get a higher valued prize on the prize wheel 420 other than the currently highlighted prize 421. Because the third option 414 provides a chance to potentially increase the prize, the system can require payment, such as an amount proportional to a maximum bet from the base game (e.g., five times the maximum bet). The first option 412, second option 413, and third option 414 are all related to taking the prize instead of taking bonus game play. Additional options, such as a fourth option 414, a fifth option 416, and a sixth option 417, are all related to taking the bonus game play. For example, the fourth option 414 provides the option to take bonus game play (e.g., ten free spins or some other form of bonus game play). The fifth option 416 offers to play the bonus game and, instead of taking the amount of value awarded through the bonus game play (e.g., instead of taking cash) gives an option at the end of the bonus game play to bank the value for future prize offerings. The system can require a payment proportional to a maximum bet (e.g., two times (2×) a maximum bet). The amount of payment can relate to a degree of volatility associated with the bonus game. For example, a bonus game may pay typically pay out in a range between 2× to 10× the average bet of the base game. The range of 2× to 10× represents a wide range of potential payout for the bonus game. The average payout of the bonus game may be around 5× the average bet. If the value of the prize is equivalent to the average payout of the bonus game, then the player may have an option to take a prize of 5× or take a chance, via option 416, to either potentially win more or less in the bonus game than 5× the average bet. Thus, because the volatility range is as high as 10× the average bet, the system can compute a risk factor regarding potential loss for the operator if a player were to bank a prize value that is twice what would normally have been offered (e.g., if the prize value is 5×, and if the player wins 10× via play of the bonus game, the operator would have to offer a prize value twice what it was originally willing to offer). The system, therefore, could require a payment with option 416 that is based on the risk factor associated with the high end of the volatility range. The sixth option 417 is similar to that of option 416 except that the player could attain, through play of the bonus game, a prize value as much as 10× the average bet and further have a chance to spin the prize wheel for a prize value that is even greater. Thus, the system can compute a risk factor associated with a high end of a prize value on a prize wheel for the potential winnings at the high end of the volatility range. The system can require payment accordingly (e.g., require payment of 10× the maximum bet).

Prize Offerings in Non-Monetary Wagering Games.

Figure 5:
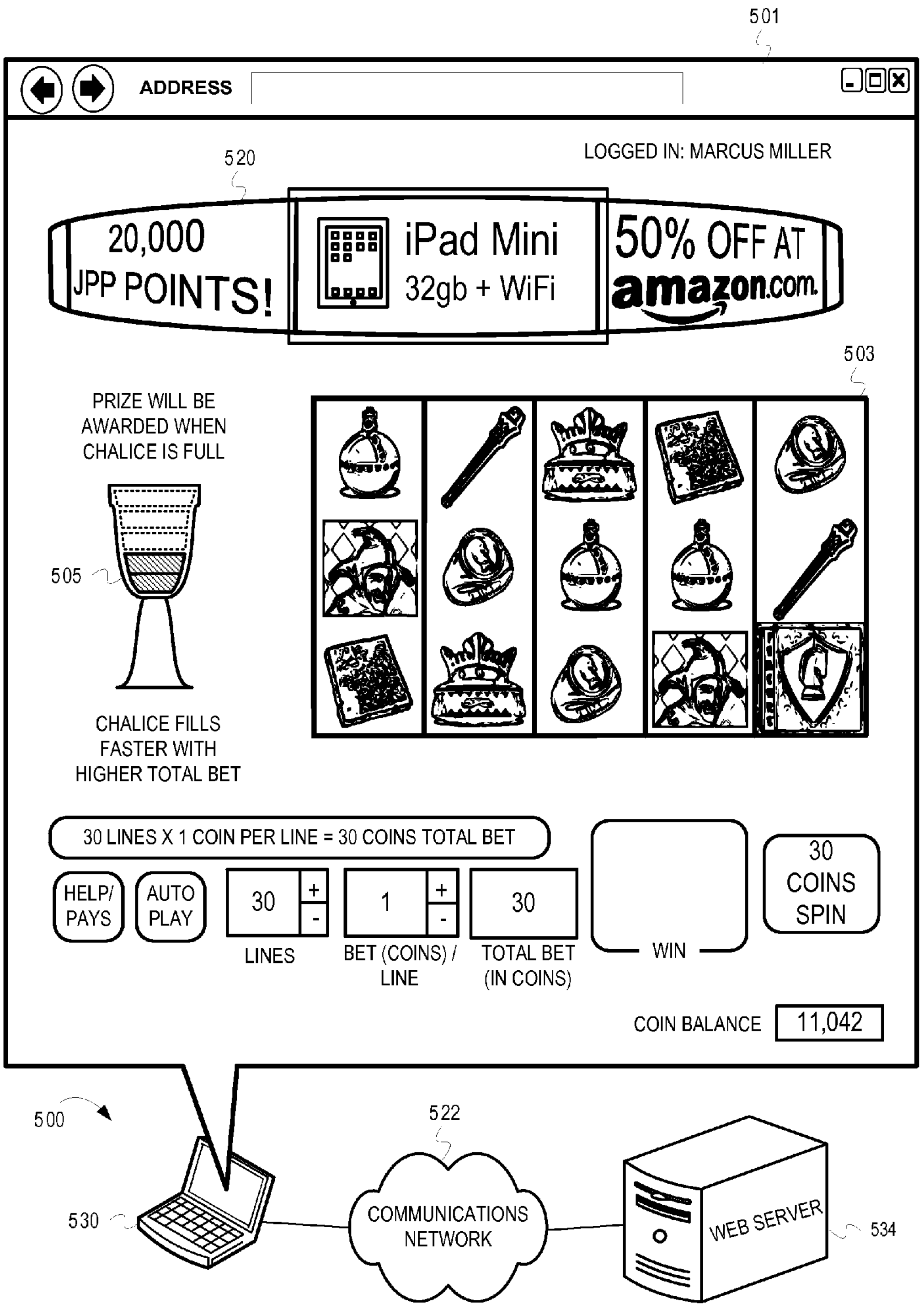
FIG. 5 is an illustration of presenting a progress meter related to a prize offering for a wagering game, according to some embodiments.

In some embodiments, the system presents an option to select a prize in place of bonus game play for wagering games with monetary wagers (e.g., wagering games where a player wagers a cash value for a potential cash award). FIGS. 1-2 illustrated an example of a wagering game with monetary based wagering (i.e., wagers made in US dollar amounts). In other embodiments, however, the system can present an option to select a prize in place of bonus game play for wagering games with non-monetary wagers (e.g., wagering games where a player wagers virtual currency, points, non-cash items, etc. for a potential non-cash award). Non-monetary wagering games may include social games or "for fun" games. In some embodiments, the wagers are for virtual "coins" which are purchased to use in a non-monetary wagering game. However, the virtual coins do not have a cash value (i.e., cannot be redeemed for cash value, but can be used for additional play in the non-monetary wagering game or for use in other games). FIG. 5 illustrates an example wagering game system ("system") 500 that includes a client device 530 (e.g., a laptop, a personal computer, a hand-held mobile device, a table computer, etc.) connected to a web server 534 via a communications network 522. The client device 530 presents a non-monetary wagering game ("wagering game") 503 via a browser application 501. The wagering game 503 utilizes virtual coins to make wagers during play of the wagering game 503. The virtual coins are purchased through an online game provider (e.g., a social gaming website, a social network, an online casino, etc.). The virtual coins do not have a cash equivalent value (i.e., are not redeemable for cash). The browser application 501 also presents a prize wheel 520 with prizes that can be selected in place of playing a bonus game (i.e., as described previously).

For non-monetary wagering games, a bonus game can be triggered which can provide a chance to win non-cash game awards (e.g., additional virtual coins). The system can offer a prize instead of game play of the bonus game. In some examples, the prize can be one or more of the following:

A) Virtual coins. The system can cycle ranges of virtual coins in a prize listing.

B) Promotional items or discounts. The system can offer coupons, gift cards, etc. for products or services by online retailers, a game website, etc. In some embodiments, the system can offer discounts, such as a percentage off for an online purchase at a marketing partner's website or to print out as a coupon for use at a retailer's physical establishment.

C) A product or service. In some examples, the system can determine a value for the product or service to offer as a prize based on a player's virtual coin balance, a player's spending history, a player's customer appreciation point balance, etc. In some embodiments, the product or service can be funded by a marketing or promotional account.

D) Entry(ies) into a competition, tournament, or sweepstakes. In some embodiments, the system can provide entries into the chance for winning a prize. For example, the system can require performance of an additional activity after the bonus game is triggered, such as performance in a tournament or competition. The prize can be offered as an award for winning the tournament or competition. In some embodiments, the system can provide entries into a sweepstakes. A number of the entries can be based on an amount or degree of a player's activities, betting, performance, achievements, etc. in the wagering game.

E) Unlocking of exclusive content. In some embodiments, the system can unlock specific content that normally would not be available.

Eligibility Requirements for Participation in a Prize Offering.

In some embodiments, the system can require that a player meet certain eligibility requirements prior to receiving an option for a prize. For example, in some embodiments described previously, a player's betting level can affect the value of a prize. For example, some requirements may be based on game play levels or play history, such as an amount of wagering on wagering games (e.g., either monetary or non-monetary). In another example, the system can alert a player, via their mobile device, to go to a particular geolocation (e.g., to a casino, or to a particular wagering game machine at a casino, etc.) to play the bonus game and/or to perform additional activities.

Some eligibility requirements may be related to time. For example, the system can require that a player be logged in and/or has wagered within a specific time period. In another example, the system can require certain eligibility requirements to be met on a periodic basis (e.g., daily, weekly, etc.). If missed, a sub-requirement (e.g., missed a day) could be made up (e.g., a player has to perform twice the spending missed in a previous day). However, if the player meets lower levels of the periodic eligibility requirements (e.g., only three of five days), then the prize value is lowered. Some periodic based eligibility requirements can be completed in advance or made up if wagering levels exceed a threshold in current or past playing session. For example, a player may not play daily (even though a daily playing requirement may be in place). However, when the player plays, the player bets high amounts. Thus, the system can detect that the player spends a lot in fewer session and, therefore, could waive certain periodic requirements or cause certain period requirements to be met in advance. In some embodiments, the system can store up requirements (e.g., if a player can only play two days a week, then the system can ensure that all eligibility requirements are met for an entire week by requiring extra spending/wagering on the days that the player can play). In some examples, those players with higher eligibility can get additional prizes (e.g., secret prizes). For example, if a player has met their daily requirements, then the extra prizes could occur either on a daily basis, at an end of a requirement period, during a bonus game, after a bonus game, etc.

Use of a Progress Meter in Connection with Prize Offerings.

In some embodiments, the system can utilize a progress meter in connection with prize offerings. For example, as illustrated in FIG. 5, a progress meter 505 indicates that an option to select a prize or a bonus game play will be presented when the progress meter 505 indicates completion.

In some examples, the progress meter 505 is linked, or associated, with the prize wheel 520. For example, the system can provide a way for a player to use some of their eligibility (e.g., use up some of the progress in the progress meter 505) to spin the prize wheel 520 for lesser prizes that are not a grand prize. In some embodiments, the progress meter 505 and prize wheel 520 can both be the same object on a user interface. In some embodiments, the degree to which the progress meter 505 fills up can affect the potential prizes (e.g., a bonus game may be triggered sometime after the progress meter 505 reaches 75% full and for progress in the progress meter 505 beyond 75% completion, the potential prizes in the prize wheel 520 increase in value until the bonus round is triggered).

Figure 6:
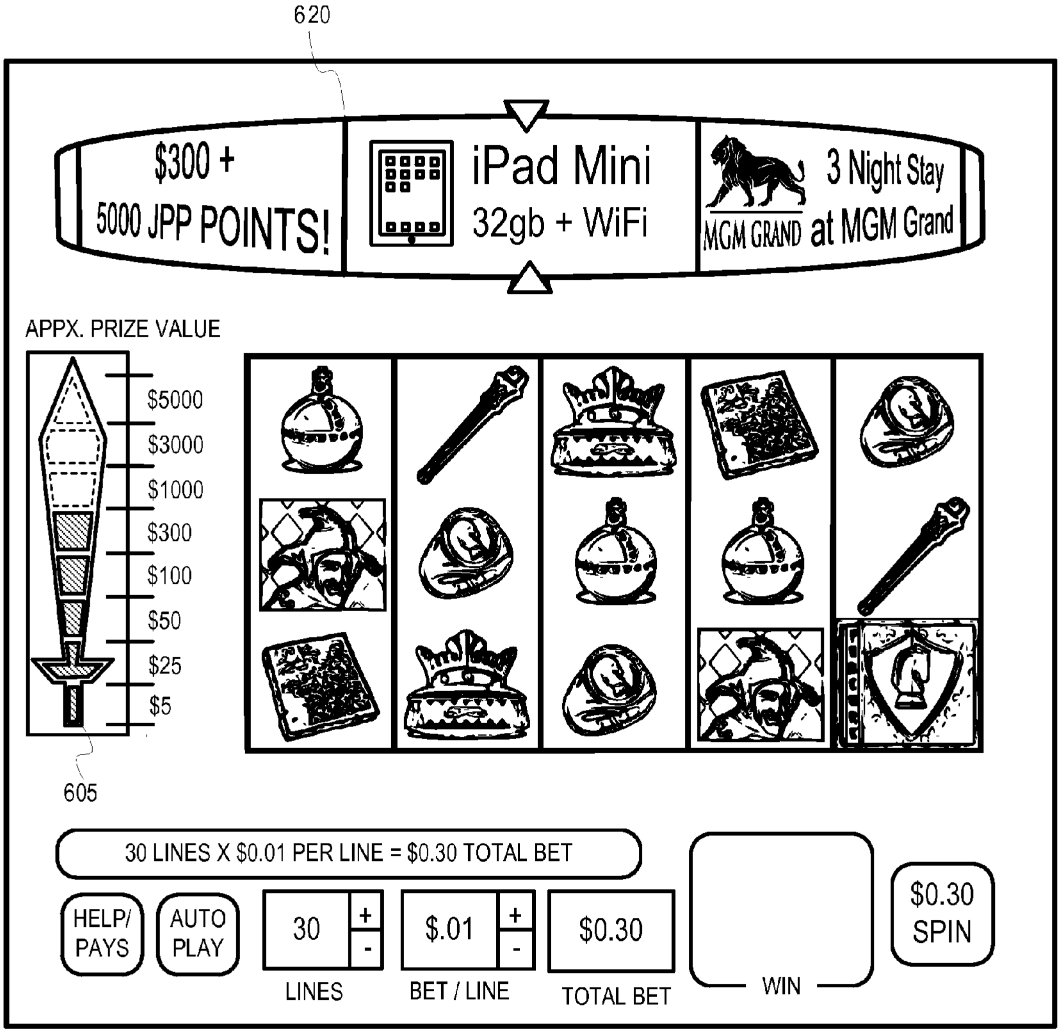
FIG. 6 is an illustration of presenting a progress meter related to a prize offering for a wagering game, according to some embodiments.

In some embodiments, eligibility requirements may be related to a progress meter. For example, the system may cause the progress meter to increase based on player bets/activities (e.g., from the player and/or from other players). In another example, the system may require a progress meter to fill up a certain number of times before the player is eligible to select or receive the prize. In yet another example, as illustrated in FIG. 6, a progress meter 605 increases to indicate only a player's potential prize value if the prize offering is triggered. The prize offering may be triggered at random without requiring the progress meter 605 to fill up. The progress meter 605, however, shows an approximate prize value range for prizes offered within a prize wheel 620.

Further, a progress meter can be utilized for single player sessions and/or for group play (e.g., group sessions, group competitions for prizes, etc.). For example, referring again to FIG. 5, the progress meter 505 can fill up during a "charge up" period based on the player's wins. Once the progress meter 505 fills up, the prize wheel 520 can lock in a currently highlighted prize and the bonus game can be triggered. The progress on the progress meter 505 can be stored in or linked with a wagering game account and/or a social network account. Game play for wagering games (e.g., either monetary or non-monetary wagering games) can both add to the progress of the progress meter 505. Monetary wagers, however, can cause the progress meter 505 to go up faster than non-monetary spending. Virtual currency that is awarded for free as part of a loyalty program may cause the progress meter 505 to increase the slower than for monetary wagering or for wagering using purchased virtual currency.

Figure 7:
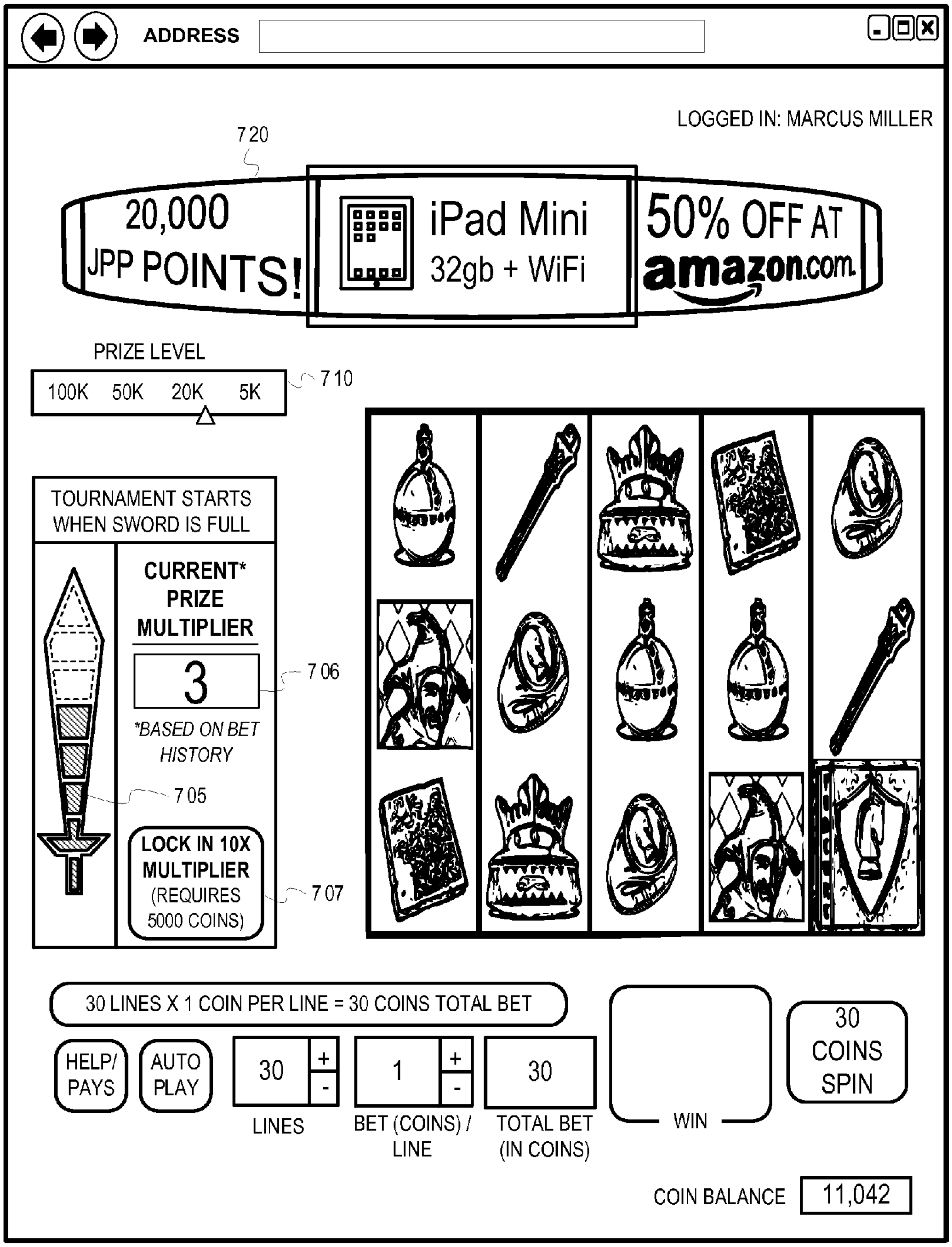
FIG. 7 is an illustration of presenting progress meters related to a prize offering for a wagering game, according to some embodiments.

In another example, as illustrated in FIG. 7, a progress meter 705 can fill up during an "eligibility" period for group players. In some embodiments, the progress meter 705 fills up according to wins made by all members of a group registered or eligible to obtain one or more of the prizes on the prize wheel 720. In one example, when the progress meter 705 fills up, the prize can be randomly awarded to one of the players in the group. In another example, when the progress meter 705 fills up, players from the group session can be entered into a group bonus game or tournament for a chance to compete for the prize. For instance, the player can be entered immediately into a bonus game for immediate group competition play. In another instance, each player in the group may be using different computing devices that run or compute at different speeds or that have different Internet access speeds. The bonus round, therefore, can have a time limit in which everyone in the group can complete their bonus round given the different computing speeds and different Internet access speeds. In some embodiments, a player in the group can be sent an invitation to perform the bonus game at their own pace.

In some embodiments, the system can detect who has the highest game score at the end of the group play. The group member with the highest game score wins at least a portion of the prize. In some embodiments, the system can present a slot tournament where the winner of the slot tournament wins the prize.

The system can also conduct card tournaments where players can receive prize options for specific items to help potentially perform better in the tournament (e.g., the system gives the player options to swap out cards, gives the player the choice to select from a best of three hands, etc.).

In some embodiments, the system can set the value of the prize based on how long the player has played and/or how much the player has wagered while the meter was filling up. Thus, in some embodiments, each player's display (e.g., a prize wheel or a progress meter) can be customized to the player's level of play (e.g., level of contribution or wagers, level of time spent playing, etc.). In the example mentioned in FIG. 7, multiple players may be competing in a group for the chance to receive a prize. By customizing a prize level to what the player spent or wagered while the progress meter 705 was filing up, the system can provide a way to compensate players who have been playing longer and/or who have contributed more in spending toward the progress of the progress meter. For instance, as illustrated in FIG. 7, a player can be assigned a multiplier value 706 based on the player's level of play. The player can utilize the multiplier for selecting a specific prize of a certain value if the player is selected for the prize or if the player wins a group bonus round. The system can also provide a way to lock in a number of multipliers prior to the progress meter 705 reaching a threshold that launches the tournament. For example, a feature 707 permits purchase of a maximum multiplier (e.g., by paying a certain number of virtual coins). In another example, the system can present a separate progress meter 710 that indicates a prize level for the prize wheel 720 (e.g., an approximate prize value similar to the progress meter 605 of FIG. 6).

In some examples, a player's past level of play can affect a number of games or playing turns the player gets in the group play for the bonus game. In some embodiments, the system can provide an option to purchase more games or playing turns in the group play. In some examples, the system can provide additional player benefits after the bonus game based on the player's level of play.

In other examples, a player may not be required to compete in group play but may, instead, be entered into a sweepstakes when a progress meter fills up. In such an example, the player's level of play can affect a number of entries entered for that player to win the prize. In some embodiments, the system can limit the entries to the first number of players who become eligible. The system can then hold the drawing after the first number of individuals have become eligible.

Example Operating Environments

This section describes example operating environments, systems, architectures, and networks, etc. and presents structural aspects of some embodiments.

Wagering Game System Architecture

Figure 8:
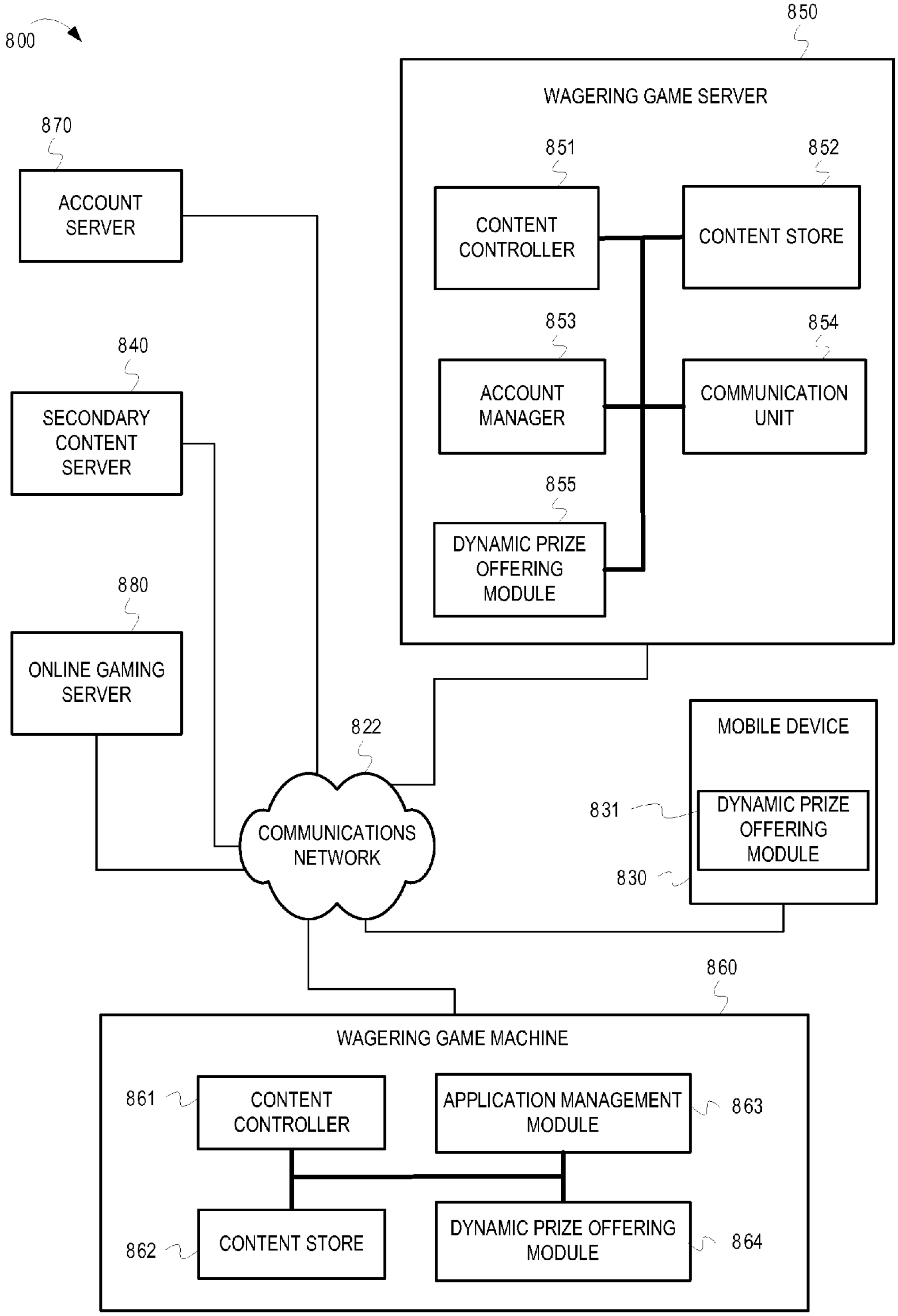
FIG. 8 is an illustration of a wagering game system architecture 800, according to some embodiments.

FIG. 8 is a conceptual diagram that illustrates an example of a wagering game system architecture 800, according to some embodiments. The wagering game system architecture 800 can include an account server 870 configured to control user related accounts accessible via wagering game networks and social networking networks. The account server 870 can store wagering game player account information, such as account settings (e.g., settings related to group games, etc., settings related to social contacts, etc.), preferences (e.g., player preferences regarding content presentable via an application of a mobile device, player preferences regarding award types, preferences related to virtual assets, etc.), player profile data (e.g., name, avatar, screen name, etc.), and other information for a player's account (e.g., financial information, account identification numbers, virtual assets, social contact information, etc.). The account server 870 can contain lists of social contacts referenced by a player account. The account server 870 can also provide auditing capabilities, according to regulatory rules. The account server 870 can also track performance of players, machines, and servers.

The wagering game system architecture 800 can also include a wagering game server 850 configured to control wagering game content, provide random numbers, and communicate wagering game information, account information, and other information to and from a wagering game machine 860. The wagering game server 850 can include a content controller 851 configured to manage and control content for presentation on the wagering game machine 860. For example, the content controller 851 can generate game results (e.g., win/loss values), including win amounts, for games played on the wagering game machine 860. The content controller 851 can communicate the game results to the wagering game machine 860. The content controller 851 can also generate random numbers and provide them to the wagering game machine 860 so that the wagering game machine 860 can generate game results. The wagering game server 850 can also include a content store 852 configured to contain content to present on the wagering game machine 860. The wagering game server 850 can also include an account manager 853 configured to control information related to player accounts. For example, the account manager 853 can communicate wager amounts, game results amounts (e.g., win amounts), bonus game amounts, etc., to the account server 870. The wagering game server 850 can also include a communication unit 854 configured to communicate information to the wagering game machine 860 and to communicate with other systems, devices and networks. The wagering game server 850 can also include a dynamic prize offering module 855 configured to dynamically provide an offering of a prize in connection with a bonus game.

The wagering game system architecture 800 can also include the wagering game machine 860 configured to present wagering games. The wagering game machine 860 can include a content controller 861 configured to manage and control content and presentation of content on the wagering game machine 860. The wagering game machine 860 can also include a content store 862 configured to contain content to present on the wagering game machine 860. The wagering game machine 860 can also include an application management module 863 configured to manage multiple instances of gaming applications. For example, the application management module 863 can be configured to launch, load, unload and control applications and instances of applications. The application management module 863 can launch different software players (e.g., a Microsoft® Silverlight™ player, an Adobe® Flash® player, etc.) and manage, coordinate, and prioritize what the software players do. The application management module 863 can also coordinate instances of server applications in addition to local copies of applications. The application management module 863 can control window locations on a wagering game screen or display for the multiple gaming applications. In some embodiments, the application management module 863 can manage window locations on multiple displays including displays on devices associated with and/or external to the wagering game machine 860 (e.g., a top display and a bottom display on the wagering game machine 860, a peripheral device connected to the wagering game machine 860, a mobile device connected to the wagering game machine 860, etc.). The application management module 863 can manage priority or precedence of client applications that compete for the same display area. For instance, the application management module 863 can determine each client application's precedence. The precedence may be static (i.e. set only when the client application first launches or connects) or dynamic. The applications may provide precedence values to the application management module 863, which the application management module 863 can use to establish order and priority. The precedence, or priority, values can be related to tilt events, administrative events, primary game events (e.g., hierarchical, levels, etc.), secondary game events, local bonus game events, advertising events, etc. As each client application runs, it can also inform the application management module 863 of its current presentation state. The applications may provide presentation state values to the application management module 863, which the application management module 863 can use to evaluate and assess priority. Examples of presentation states may include celebration states (e.g., indicates that client application is currently running a win celebration), playing states (e.g., indicates that the client application is currently playing), game starting states (e.g., indicates that the client application is showing an invitation or indication that a game is about to start), status update states (e.g., indicates that the client application is not 'playing' but has a change of status that should be annunciated, such as a change in progressive meter values or a change in a bonus game multiplier), idle states (e.g., indicates that the client application is idle), etc. In some embodiments, the application management module 863 can be pre-configurable. The system can provide controls and interfaces for operators to control screen layouts and other presentation features for the configuring of the application management module 863. The application management module 863 can communicate with, and/or be a communication mechanism for, a base game stored on a wagering game machine. For example, the application management module 863 can communicate events from the base game such as the base game state, pay line status, bet amount status, etc. The application management module 863 can also provide events that assist and/or restrict the base game, such as providing bet amounts from secondary gaming applications, inhibiting play based on gaming event priority, etc. The application management module 863 can also communicate some (or all) financial information between the base game and other applications including amounts wagered, amounts won, base game outcomes, etc. The application management module 863 can also communicate pay table information such as possible outcomes, bonus frequency, etc. In some embodiments, the application management module 863 can control different types of applications. For example, the application management module 863 can perform rendering operations for presenting applications of varying platforms, formats, environments, programming languages, etc. For example, the application management module 863 can be written in one programming language format (e.g., JavaScript, Java, C++, etc.) but can manage, and communicate data from, applications that are written in other programming languages or that communicate in different data formats (e.g., Adobe® Flash®, Microsoft® Silverlight™, Adobe® Air™, hyper-text markup language, etc.). The application management module 863 can include a portable virtual machine capable of generating and executing code for the varying platforms, formats, environments, programming languages, etc. The application management module 863 can enable many-to-many messaging distribution and can enable the multiple applications to communicate with each other in a cross-manufacturer environment at the client application level. For example, multiple gaming applications on a wagering game machine may need to coordinate many different types of gaming and casino services events (e.g., financial or account access to run spins on the base game and/or run side bets, transacting drink orders, tracking player history and player loyalty points, etc.).

The wagering game machine 860 can also include a dynamic prize offering module 864 configured to dynamically provide an offering of a prize in connection with a bonus game.

The wagering game system architecture 800 can also include the secondary content server 840 configured to provide content and control information for secondary games and other secondary content available on a wagering game network (e.g., secondary wagering game content, promotions content, advertising content, player tracking content, web content, etc.). The secondary content server 840 can provide "secondary" content, or content for "secondary" games presented on the wagering game machine 860. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content can be in one or more different formats, such as Adobe® Flash®, Microsoft® Silverlight™, Adobe® Air™, hyper-text markup language, etc. In some embodiments, the secondary content server 840 can provide and control content for community games, including networked games, social games, competitive games, or any other game that multiple players can participate in at the same time. In some embodiments, the secondary content server 840 can control and present an online website that hosts wagering games. The secondary content server 840 can also be configured to present multiple wagering game applications on the wagering game machine 860 via a wagering game website, or other gaming-type venue accessible via the Internet. The secondary content server 840 can host an online wagering website and/or a social networking website. The secondary content server 840 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The secondary content server 840 can also be configured to provide content presentable via an application of the mobile device 830. In some embodiments, the secondary content server 840 can also host social networking accounts, provide social networking content, control social networking communications, store associated social contacts, etc. The secondary content server 840 can also provide chat functionality for a social networking website, a chat application, or any other social networking communications mechanism. In some embodiments, the secondary content server 840 can utilize player data to determine marketing promotions that may be of interest to a player account. The secondary content server 840 can also analyze player data and generate analytics for players, group players into demographics, integrate with third party marketing services and devices, etc. The secondary content server 840 can also provide player data to third parties that can use the player data for marketing. In some embodiments, the secondary content server 840 can provide one or more social networking communication mechanisms that publish (e.g., post, broadcast, etc.) a message to a mass (e.g., to multiple people, users, social contacts, accounts, etc.). The social networking communication mechanism can publish the message to the mass simultaneously. Examples of the published message may include, but not be limited to, a blog post, a mass message post, a news feed post, a profile status update, a mass chat feed, a mass text message broadcast, a video blog, a forum post, etc. Multiple users and/or accounts can access the published message and/or receive automated notifications of the published message.

The wagering game system architecture 800 can also include the online gaming server 880 configured to control and present a website that hosts gaming related content (e.g., monetary type wagering games, non-monetary type wagering games, social networking content related to gaming, etc.). The online gaming server 880 can be configured to present multiple applications on the website via the Internet. The online gaming server 880 can host a social network. The online gaming server 880 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The online gaming server 880 can also be configured to provide content presentable via an application of the mobile device 830.

The wagering game system architecture 800 can also include the mobile device 830 configured to control mobile communications and applications. The mobile device 830 may also be referred to as a handheld device, a handheld computer or simply handheld. In some embodiments, the mobile device 830 is a pocket-sized computing device, having a display screen with touch input and/or a miniature keyboard. Some examples of the mobile device 830 may include, but are not limited to, a smartphone, a personal digital assistant, a mobile computer, a mobile internet device, a portable media player, a mobile phone, a pager, a personal navigation device, etc. In some embodiments, the mobile device 830 functions via a wireless application protocol (WAP). In some embodiments, the mobile device 830 may include integrated data capture devices like barcode readers, radio frequency identification (RFID) readers, In-cell Optical LCD readers, and smart card readers. In some embodiments, the mobile device 830 is configured to communicate with wagering game devices, such as the wagering game server 850, the wagering game machine 860, the online gaming server 880, the secondary content server 840, and the account server 870. In some embodiments the mobile device 830 is personal (i.e., belongs to a user), which the user can carry on their person. The mobile device 830 can include a dynamic prize offering module 831 configured to dynamically provide an offering of a prize in connection with a bonus game.

Each component shown in the wagering game system architecture 800 is shown as a separate and distinct element connected via a communications network 822. However, some functions performed by one component could be performed by other components. For example, the wagering game server 850 can also be configured to perform functions of the application management module 863, and other network elements and/or system devices. Furthermore, the components shown may all be contained in one device, but some, or all, may be included in, or performed by, multiple devices, as in the configurations shown in FIG. 8 or other configurations not shown. For example, the account manager 853 and the communication unit 854 can be included in the wagering game machine 860 instead of, or in addition to, being a part of the wagering game server 850. Further, in some embodiments, the wagering game machine 860 can determine wagering game outcomes, generate random numbers, etc. instead of, or in addition to, the wagering game server 850.

The wagering game machines described herein (e.g., wagering game machine 860) can take any suitable form, such as floor standing models, handheld mobile wagering game machines, bar-top models, workstation-type console models, surface computing machines, etc. Further, wagering game machines can be primarily dedicated for use in conducting wagering games.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 800 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Wagering Game Machine Architecture

Figure 9:
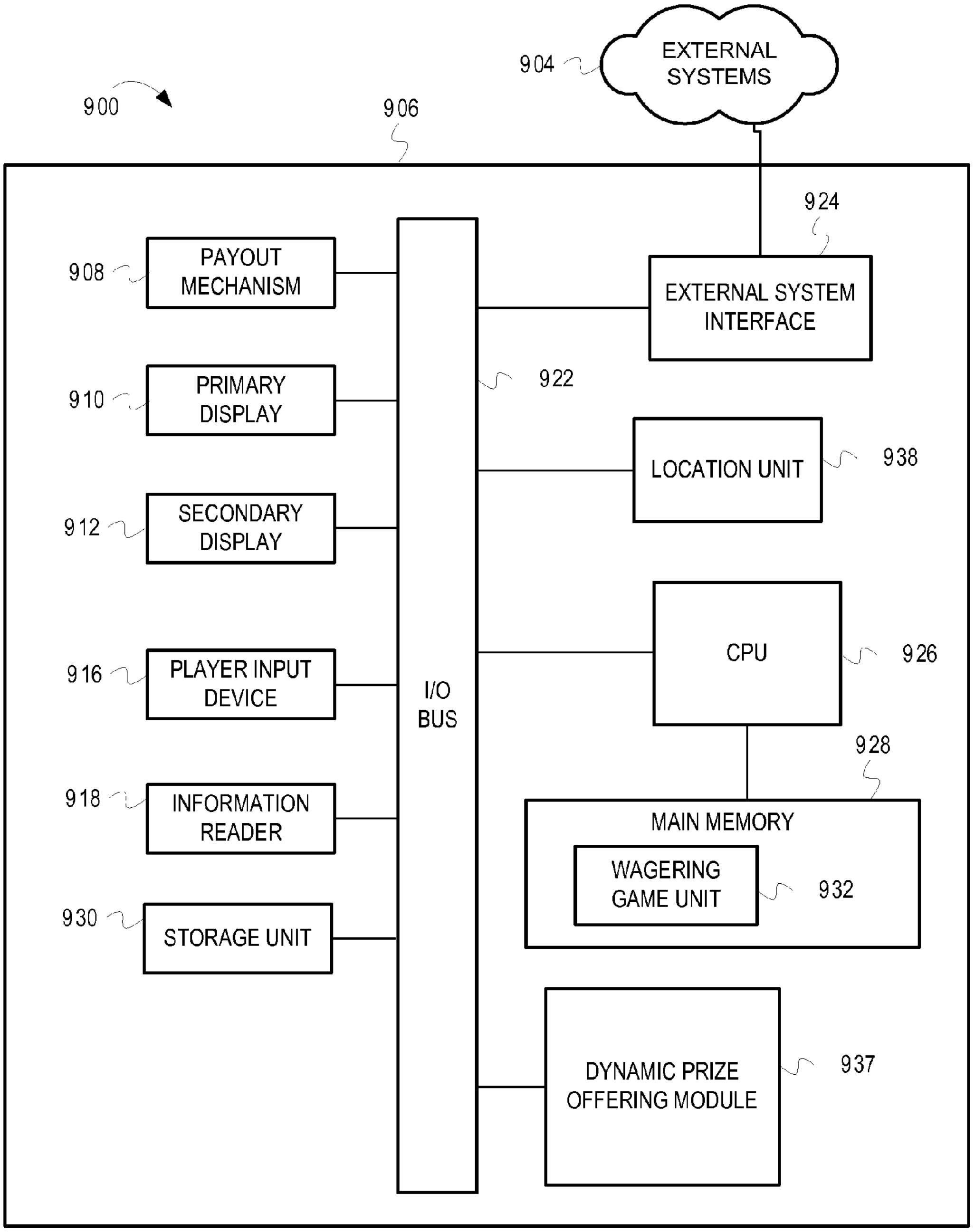
FIG. 9 is an illustration of a wagering game machine architecture 900, according to some embodiments.

FIG. 9 is a conceptual diagram that illustrates an example of a wagering game machine architecture 900, according to some embodiments. In FIG. 9, the wagering game machine architecture 900 includes a wagering game machine 906, which includes a central processing unit (CPU) 926 connected to main memory 928. The CPU 926 can include any suitable processor, such as an Intel® Pentium processor, Intel® Core 2 Duo processor, AMD Opteron™ processor, or UltraSPARC processor. The main memory 928 includes a wagering game unit 932. In some embodiments, the wagering game unit 932 can present wagering games, such as video poker, video black jack, video slots, video lottery, reel slots, etc., in whole or part.

The CPU 926 is also connected to an input/output ("I/O") bus 922, which can include any suitable bus technologies, such as an AGTL+ frontside bus and a PCI backside bus. The I/O bus 922 is connected to a payout mechanism 908, primary display 910, secondary display 912, value input device 914, player input device 916, information reader 918, and storage unit 930. The player input device 916 can include the value input device 914 to the extent the player input device 916 is used to place wagers. The I/O bus 922 is also connected to an external system interface 924, which is connected to external systems 904 (e.g., wagering game networks). The external system interface 924 can include logic for exchanging information over wired and wireless networks (e.g., 802.11g transceiver, Bluetooth transceiver, Ethernet transceiver, etc.)

The I/O bus 922 is also connected to a location unit 938. The location unit 938 can create player information that indicates the wagering game machine's location/movements in a casino. In some embodiments, the location unit 938 includes a global positioning system (GPS) receiver that can determine the wagering game machine's location using GPS satellites. In other embodiments, the location unit 938 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 9, in some embodiments, the location unit 938 is not connected to the I/O bus 922.

In some embodiments, the wagering game machine 906 can include additional peripheral devices and/or more than one of each component shown in FIG. 9. For example, in some embodiments, the wagering game machine 906 can include multiple external system interfaces 924 and/or multiple CPUs 926. In some embodiments, any of the components can be integrated or subdivided.

In some embodiments, the wagering game machine 906 includes a dynamic prize offering module 937. The dynamic prize offering module 937 can process communications, commands, or other information, where the processing can dynamically offer prizes in wagering games (e.g., dynamically provide an offering of a prize option in connection with a bonus game).

Furthermore, any component of the wagering game machine 906 can include hardware, firmware, and/or machine-readable storage media including instructions for performing the operations described herein.

Wagering Game System

Figure 10:
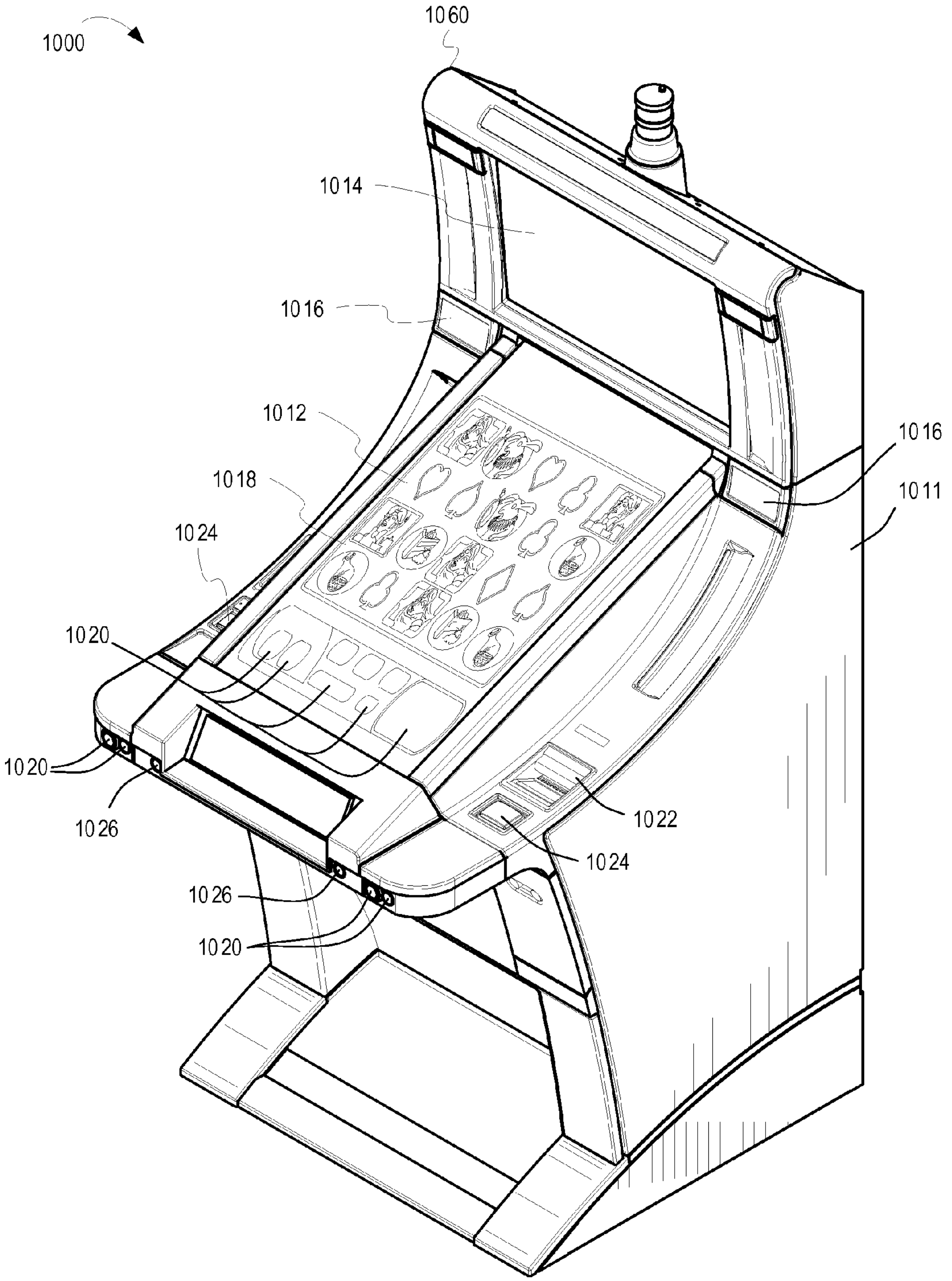
FIG. 10 is an illustration of a wagering game system 1000, according to some embodiments.

FIG. 10 is a conceptual diagram that illustrates an example of a wagering game system 1000, according to some embodiments. In FIG. 10, the wagering game system 1000 includes a wagering game machine 1060 similar to those used in gaming establishments, such as casinos. The wagering game machine 1060 may, in some examples, be referred to as a gaming terminal or an electronic gaming machine. The wagering game machine 1060 may have varying structures and methods of operation. For example, the wagering game machine 1060 may include electromechanical components configured to play mechanical slots. In another example, the 1060 includes electronic components configured to play a video casino game, such as slots, keno, poker, blackjack, roulette, craps, etc. The wagering game machine 1060 is depicted as a floor-standing model. However, other examples of wagering game machines include handheld mobile units, bartop models, workstation-type console models, etc. Further, the wagering game machine 1060 may be primarily dedicated for use in conducting wagering games, or may include non-dedicated devices, such as mobile phones, personal digital assistants, personal computers, etc. Exemplary types of wagering game machines are disclosed in U.S. Pat. No. 6,517,433 and Patent Application Publication Nos. US2010/0062196 and US2010/0234099, which are incorporated herein by reference in their entireties.

The wagering game machine 1060 illustrated in FIG. 10 comprises a cabinet 1011 that may house various input devices, output devices, and input/output devices. By way of example, the wagering game machine 1060 includes a primary display area 1012, a secondary display area 1014, and one or more audio speakers 1016. The primary display area 1012 or the secondary display area 1014 may include one or more of a cathode ray tube (CRT), a high resolution liquid crystal display (LCD), a plasma display, a light emitting diode (LED) display, a three-dimensional (3D) display, a video display, or a combination thereof. In some examples, the primary display area 1012 or the secondary display area 1014 includes mechanical reels to display a wagering game outcome. In some example, the primary display area 1012 or the secondary display area 1014 present a transmissive video display disposed in front of a mechanical-reel display to portray a video image superimposed upon the mechanical-reel display. In FIG. 10, the wagering game machine 1060 is a "slant-top" version in which the primary display 1012 is slanted (e.g., at about a thirty-degree angle toward the player of the wagering game machine 1060). Another example of wagering game machine 1060 is an "upright" version in which the primary display 1014 is oriented vertically relative to the player. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the wagering game machine 1060. The wagering game machine 1060 includes a touch screen(s) 1018 mounted over the primary or secondary areas, buttons 1020 on a button panel, bill validator 1022, information reader/writer(s) 1024, and player-accessible port(s) 1026 (e.g., audio output jack for headphones, video headset jack, USB port, wireless transmitter/receiver, etc.). It should be understood that numerous other peripheral devices and other elements exist and are readily utilizable in any number of combinations to create various forms of a wagering game machine in accord with the present concepts.

Input devices, such as the touch screen 1018, buttons 1020, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form (e.g., software, processing application) readable by a machine (e.g., a computer). For example, machine-readable storage media includes magnetic storage medium (e.g., floppy diskette), read only memory (ROM), random access memory (RAM), magnetic disk storage media, optical storage media (e.g., CD-ROM), magneto-optical storage media, flash memory, erasable programmable memory (e.g., EPROM and EEPROM), or other types of media suitable for storing electronic instructions. In addition, embodiments may be embodied in a machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A gaming system configured to provide one or more casino wagering games, the gaming system comprising:

at least one processor;

at least one wagering game outcome generator configured to generate one or more random game outcomes for the one or more casino wagering games; and at least one memory device configured to store instructions which, when executed by the at least one processor, cause the gaming system to perform operations to, provide, for presentation via a display device of a wagering game machine, a primary wagering game from the one or more casino wagering games, wherein the wagering game machine includes a value input device configured to receive physical money for placement of wagers on the one or more casino wagering games, detect a first event that occurs during a first playing round of the primary wagering game, in response to detection of the first event, provide, for presentation via the display device, a first option to play a first playing round of a bonus wagering game, wherein the first playing round of the bonus wagering game provides a chance of winning a first bonus award and a chance of not winning the first bonus award based on a random outcome of the bonus wagering game, and in response to the detection of the first event, detect that a first prize is highlighted in a listing of a first set of prizes that cycle, without user input, before occurrence of the first event, wherein the first set of prizes is unavailable from the primary wagering game and unavailable from the bonus wagering game, and provide, for presentation, a second option configured to, when selected by user input, instantly award the first prize instead of the play of the first playing round of the bonus wagering game, wherein the first prize is unrelated to results of the bonus wagering game, and wherein the first prize is unrelated to results from the primary wagering game.

2. The gaming system of claim 1, wherein the at least one memory device is configured to store instructions which, when executed by the at least one processor, cause the gaming system to further perform operations to present a third option to save a monetary value of the first prize in a first account without providing the first prize, wherein the first-account is separate from a wagering game player account, wherein the monetary value is available, in the first account, as a secondary form of value separate from funds used for the primary wagering game, wherein the secondary form of value is accessible to increase a prize value range of one or more additional prizes unrelated to the results of the bonus wagering game and the results of the primary wagering game, and wherein the monetary value is not accessible as a cash award.

3. The gaming system of claim 1, wherein the at least one memory device is configured to store instructions which, when executed by the at least one processor, cause the gaming system to further perform operations to:

detect a selection of a third option to save a monetary value of the first prize in an account;

detect a second event during a second playing round of the primary wagering game that occurs after the first playing round of the primary wagering game;

in response to the second event, provide, for presentation, a fourth option to select a second prize instead of playing a second playing round of the bonus wagering game, wherein the second playing round of the bonus wagering game provides a potential of winning a second bonus award separate from one or more payouts of the primary wagering game, and wherein the second prize is separate from the one or more payouts of the primary wagering game and separate from the second bonus award; and use the monetary value of the first prize saved in the account to increase a value of the second prize.

4. The gaming system of claim 1, wherein the at least one memory device is configured to store instructions which, when executed by the at least one processor, cause the gaming system to perform operations to:

provide, for presentation, the listing of the first set of prizes;

cause the listing to cycle, without user input, through the first set of prizes prior to the first event, wherein one of the first set of prizes is highlighted at any given point in the cycle to indicate that the one of the first set of prizes is awardable as the first prize; and specify the first prize in the second option in response to detection that the first prize is highlighted on the listing when the first event occurs.

5. The gaming system of claim 1, wherein the at least one memory device is configured to store instructions which, when executed by the at least one processor, cause the gaming system to perform operations to:

determine that betting activity made in the primary wagering game corresponds to one of a plurality of betting levels, wherein the betting activity occurs before the first event; and determine that a value for the one of the plurality of betting levels corresponds to a prize value range for the first set of prizes, wherein the first set of prizes is one of a plurality of sets of prizes having different prize value ranges, wherein each of the plurality of betting levels corresponds to each of the prize value ranges, and wherein the plurality of sets of prizes are unavailable in the primary wagering game and unavailable in the bonus wagering game.

6. The gaming system of claim 1, wherein the at least one memory device is configured to store instructions which, when executed by the at least one processor, cause the gaming system to perform operations to:

determine a value for the first prize based on a value of one or more of a betting level made in the primary wagering game before the first event occurs and a betting history by a player account associated with the primary wagering game.

7. The gaming system of claim 1, wherein the at least one memory device is configured to store instructions which, when executed by the at least one processor, cause the gaming system to perform operations to:

detect a selection of the second option;

award the first prize;

determine a market value for the first prize, wherein the first prize is not a credit payout of the primary wagering game; and determine an average expected payout for the bonus wagering game using the market value for the first prize.

8. The gaming system of claim 7, wherein the first prize is one or more of a non-cash item and a service, and wherein the determining the market value of the first prize comprises accessing an online source that indicates one or more of a manufacturer's suggested retail price, a wholesale price, and a sales cost of the one or more of the non-cash item and the service.

9. The gaming system of claim 1, wherein the at least one memory device is configured to store instructions which, when executed by the at least one processor, cause the gaming system to perform operations to:

detect selection of the second option;

determine that a value for the first prize is different from an average expected payout for the bonus wagering game in response to detecting the selection of the second option; and in response to determination that the value for the first prize is different from the average expected payout for the bonus wagering game, cause a change in a frequency of subsequent triggering of the bonus wagering game.

10. The gaming system of claim 1, wherein the at least one memory device is configured to store instructions which, when executed by the at least one processor, cause the gaming system to perform operations to:

detect a selection of the second option;

determine that a value for the first prize is less than an average expected payout for the bonus wagering game; and in response, cause a payment of an amount equivalent to a difference between the value of the first prize and the average expected payout during subsequent presentation of the primary wagering game.

11. The gaming system of claim 1, wherein the at least one memory device is configured to store instructions which, when executed by the at least one processor, cause the gaming system to perform operations to:

detect that the second option is selected; and provide a value for the first prize to be used in a computation of an average payout for the bonus wagering game.

12. The gaming system of claim 1, wherein the first event comprises an event separate from the primary wagering game.

13. The gaming system of claim 12, wherein the first event comprises one or more of a mystery event, an event from an ongoing wagering game, an event from an ongoing promotion, an environmental event, and an event related to additional gaming devices other than the gaming system.

14. A method of operating a gaming system primarily dedicated to providing regulated wagering games, the gaming system including a wagering game outcome generator, and one or more wagering game controllers, said method comprising:

providing, by at least one of the one or more wagering game controllers, a primary wagering game for presentation via a display device of a wagering game machine, wherein the primary wagering game is one of the regulated wagering games, and wherein the wagering game machine includes a value input device configured to receive physical money for placement of wagers on the primary wagering game;

detecting, by at least one of the one or more wagering game controllers, a first event that occurs during a first playing round of the primary wagering game;

in response to the detecting the first event, providing, for presentation via the display device, a first option to initiate a first playing round of a bonus wagering game separate from the primary wagering game, wherein the first playing round of the bonus wagering game provides a chance of winning a first bonus award and a chance of not winning the first bonus award based on a random outcome of the bonus wagering game, and wherein the first bonus award is other than a payout of the primary wagering game that results from one or more random game outcomes generated by the wagering game outcome generator; and in response to the detecting the first event, detecting that a first prize is highlighted in a listing of a first set of prizes that cycle, without user input, before occurrence of the first event, wherein the first set of prizes are unavailable from the primary wagering game and unavailable from the bonus wagering game, and providing, for presentation via the display device, a second option configured to, when selected by user input, instantly provide the first prize instead of providing the chance of winning the first bonus award and the chance of not winning the first bonus award associated with playing the first playing round of the bonus wagering game, wherein the first prize is other than a payout of the primary wagering game and other than a bonus award of the bonus wagering game.

15. The method of claim 14 further comprising:

presenting a third option to save a monetary value of the first prize in an account instead of selecting the first prize, wherein the monetary value is a secondary currency separate from funds used for the primary wagering game.

16. The method of claim 14 further comprising:

detect a selection of a third option to save a monetary value of the first prize in an account without providing the first prize;

detecting a second event in a second playing round of the primary wagering game that occurs after the first playing round of the primary wagering game;

in response to the second event, provide, for presentation, a fourth option to select a second prize instead of initiating a second playing round of the bonus wagering game, wherein the second playing round of the bonus wagering game provides a potential of winning a second bonus award separate from one or more payouts of the primary wagering game, and wherein the second prize is separate from the one or more payouts of the primary wagering game and separate from the second bonus award; and using the monetary value, of the first prize, saved in the account to increase a value of the second prize.

17. The method of claim 14 further comprising:

detecting selection of the first option;

initiating the first playing round of the bonus wagering game instead of awarding the first prize; and after play of the bonus wagering game, presenting a third option to select a second prize of equal or greater value than an amount of winnings obtained via the first playing round of the bonus wagering game.

18. The method of claim 14 further comprising:

providing, for presentation, the listing of the first set of prizes;

causing the listing to cycle, without user input, through the first set of prizes prior to the first event, wherein one of the first set of prizes is highlighted at any given point in the cycle to indicate that the one of the first set of prizes is awardable as the first prize; and specifying the first prize in the second option in response to the detecting that the first prize is the one of the first set of prizes highlighted on the listing when the first event occurs.

19. The method of claim 14 further comprising:

determining a value for the first prize based on a value of one or more of a betting level made in the primary wagering game before the first event occurs or a betting history by a player account associated with the primary wagering game.

20. The method of claim 14 further comprising:

detecting selection of the second option; and determining an average expected payout for the bonus wagering game using a market value for the first prize.

21. The method of claim 14 further comprising:

detecting a selection of the second option;

determining that a value for the first prize is different from an average expected payout for the bonus wagering game in response to detecting the selection of the second option; and in response to the determining that the value for the first prize is different from the average expected payout for the bonus wagering game, causing a change in a frequency of subsequent triggering of the bonus wagering game.

22. The method of claim 14 further comprising:

determining that betting made in the primary wagering game before the first event equates to a first betting level from a plurality of betting levels;

determining that the first betting level corresponds to a first prize value range from a plurality of prize value ranges for a plurality of prizes unavailable in the primary wagering game and unavailable in the bonus wagering game, wherein each of the plurality of betting levels corresponds to each of the plurality of prize value ranges; and providing, for presentation, an indication of a first portion of the plurality of prizes with market values in the first prize value range.

23. The method of claim 22 further comprising:

determining, after first event, that additional betting made in the primary wagering game equates to a second betting level from the plurality of betting levels;

determining that the second betting level corresponds to a second prize value range from the plurality of prize value ranges; and providing, for presentation, an indication of a second portion of the plurality of prizes with market values in the second prize value range.

24. The method of claim 22 further comprising:

causing the indication of the first portion of the plurality of prizes to cycle, without user input, through the first portion of the plurality of prizes, wherein only one of the first portion of the plurality of prizes is highlighted at any given point in the cycle to indicate that the one of the first portion of the plurality of prizes is awardable as the first prize.

25. One or more non-transitory, machine-readable storage media having instructions stored thereon, which, when executed by a set of one or more processors of a gaming system, cause the set of one or more processors to perform operations comprising:

providing a primary wagering game for presentation via a display device of a wagering game machine, wherein the wagering game machine includes a value input device configured to receive physical money for placement of wagers on the primary wagering game;

detecting a first event that occurs during a first playing round of the primary wagering game;

in response to the detecting the first event, providing, for presentation, a first option, responsive to user input, to play a first playing round of a bonus wagering game separate from the primary wagering game, wherein the first playing round of the bonus wagering game provides a chance of winning a first bonus award and a chance of not winning the first bonus award based on a random outcome of the bonus wagering game, and wherein the first bonus award is other than a payout of the primary wagering game that results from one or more random game outcomes generated by a random number generator of the gaming system;

detecting that a first prize is highlighted in a listing of a first set of prizes that cycle, without user input, before occurrence of the first event, wherein the first set of prizes are unavailable from the primary wagering game and unavailable from the bonus wagering game; and providing, for presentation via the display device, a second option configured to, when selected by user input, provide the first prize instead of providing the chance of not winning the first bonus award associated with playing the first playing round of the bonus wagering game, wherein the providing the second option is in response to the detecting the first event, and wherein the first prize is unrelated to results of the bonus wagering game and unrelated to results of the primary wagering game, and providing a value for the first prize for use in computing an average payout associated with the bonus wagering game.

26. The one or more non-transitory, machine-readable storage media of claim 25, the operations further comprising:

presenting a third option to save a monetary value of the first prize in a player account instead of the first prize, wherein the monetary value is a secondary form of value separate from a primary form of value used for the primary wagering game.

27. The one or more non-transitory, machine-readable storage media of claim 25, the operations further comprising:

determining a value for the first prize based on a value of one or more of a betting level made in the primary wagering game before the first event occurs or a betting history by a player account associated with the primary wagering game.

28. The one or more non-transitory, machine-readable storage media of claim 25, the operations further comprising:

detecting selection of the second option; and determining an average expected payout for the bonus wagering game using a market value for the first prize.

29. The one or more non-transitory, machine-readable storage media of claim 25, the operations further comprising:

presenting a third option to spin a prize wheel for a chance to obtain a second prize different from the first prize offered in the second option.

30. The one or more non-transitory, machine-readable storage media of claim 25, the operations further comprising:

providing, for presentation, the listing of the first set of prizes;

causing the listing to cycle, without user input, through the first set of prizes prior to the first event, wherein one of the first set of prizes is highlighted at any given point in the cycle to indicate that the one of the first set of prizes is awardable as the first prize; and specifying the first prize in the second option in response to the detecting that the first prize is the one of the first set of prizes highlighted on the listing when the first event occurs.

31. A gaming system configured to provide one or more casino wagering games, the gaming system comprising:

at least one processor;

at least one wagering game outcome generator configured to generate one or more random game outcomes for the one or more casino wagering games; and at least one memory device configured to store instructions which, when executed by the at least one processor, cause the gaming system to perform operations to, provide, for presentation via a display device of a wagering game machine, a primary wagering game from the one or more casino wagering games, wherein the wagering game machine is includes a value input device configured to receive physical money for placement of wagers on the primary wagering game, detect a first event that occurs during a first playing round of the primary wagering game, in response to detection of the first event, provide, for presentation via the display device, a first option to play a first playing round of a bonus wagering game, wherein the first playing round of the bonus wagering game provides a chance of winning a first bonus award and a chance of not winning the first bonus award based on a random outcome of the bonus wagering game, in response to the detection of the first event, provide, for presentation, a second option configured to, when selected by user input, instantly award a first prize instead of the play of the first playing round of the bonus wagering game, wherein the first prize is unrelated to results of the bonus wagering game, and wherein the first prize is unrelated to results from the primary wagering game, and present a third option to save a monetary value of the first prize in an account without providing the first prize, wherein the monetary value is available, in the account, as a secondary form of value separate from funds used for the primary wagering game, wherein the secondary form of value is accessible to increase a prize value range of one or more additional prizes unrelated to the results of the bonus wagering game and unrelated to the results of the primary wagering game, and wherein the monetary value is not accessible as a cash award.

32. A method of operating a gaming system primarily dedicated to providing regulated wagering games, the gaming system including a wagering game outcome generator, and one or more wagering game controllers, said method comprising:

providing, by at least one of the one or more wagering game controllers, a primary wagering game for presentation via a display device of a wagering game machine, wherein the primary wagering game is one of the regulated wagering games, and wherein the wagering game machine is includes a value input device configured to receive physical money for placement of wagers on the primary wagering game;

detecting, by at least one of the one or more wagering game controllers, a first event that occurs during a first playing round of the primary wagering game;

in response to the detecting the first event, providing, for presentation via the display device, a first option to initiate a first playing round of a bonus wagering game separate from the primary wagering game, wherein the first playing round of the bonus wagering game provides a chance of winning a first bonus award and a chance of not winning the first bonus award based on a random outcome of the bonus wagering game, and wherein the first bonus award is other than a payout of the primary wagering game that results from one or more random game outcomes generated by the wagering game outcome generator;

in response to the detecting the first event, providing, for presentation via the display device, a second option configured to, when selected by user input, instantly provide a first prize instead of providing the chance of winning the first bonus award and instead of providing the chance of not winning the first bonus award associated with playing the first playing round of the bonus wagering game, and wherein the first prize is other than a payout of the primary wagering game and other than a bonus award of the bonus wagering game;

detecting a selection of a third option to save a monetary value of the first prize in an account;

detecting a second event during a second playing round of the primary wagering game that occurs after the first playing round of the primary wagering game;

in response to the second event, providing, for presentation, a fourth option to select a second prize instead of playing a second playing round of the bonus wagering game, wherein the second playing round of the bonus wagering game provides a potential of winning a second bonus award separate from one or more payouts of the primary wagering game, and wherein the second prize is separate from the one or more payouts of the primary wagering game and separate from the second bonus award; and using the monetary value of the first prize saved in the account to increase a value of the second prize.

33. A method of operating a gaming system primarily dedicated to providing regulated wagering games, the gaming system including a wagering game outcome generator, and one or more wagering game controllers, said method comprising:

providing, by at least one of the one or more wagering game controllers, a primary wagering game for presentation via a display device of a wagering game machine, wherein the primary wagering game is one of the regulated wagering games;

detecting, by at least one of the one or more wagering game controllers, a first event that occurs during a first playing round of the primary wagering game;

in response to the detecting the first event, providing, for presentation via the display device, a first option to initiate a first playing round of a bonus wagering game separate from the primary wagering game, wherein the first playing round of the bonus wagering game provides a chance of winning a first bonus award and a chance of not winning the first bonus award based on a random outcome of the bonus wagering game, and wherein the first bonus award is other than a payout of the primary wagering game that results from one or more random game outcomes generated by the wagering game outcome generator; and in response to the detecting the first event, providing, for presentation via the display device, a second option configured to, when selected by user input, instantly provide a first prize instead of providing the chance of winning the first bonus award and instead of providing the chance of not winning the first bonus award associated with playing the first playing round of the bonus wagering game, and wherein the first prize is other than a payout of the primary wagering game and other than a bonus award of the bonus wagering game;

determining that betting made in the primary wagering game before the first event equates to a first betting level from a plurality of betting levels;

determining that the first betting level corresponds to a first prize value range from a plurality of prize value ranges for a plurality of prizes unavailable in the primary wagering game and unavailable in the bonus wagering game, wherein each of the plurality of betting levels corresponds to each of the plurality of prize value ranges; and providing, for presentation, an indication of a first portion of the plurality of prizes with market values in the first prize value range.

34. The method of claim 33 further comprising:

determining, after the first event, that additional betting made in the primary wagering game equates to a second betting level from the plurality of betting levels;

determining that the second betting level corresponds to a second prize value range from the plurality of prize value ranges; and providing, for presentation, an indication of a second portion of the plurality of prizes with market values in the second prize value range.

35. The method of claim 33 further comprising:

causing the indication of the first portion of the plurality of prizes to cycle, without user input, through the first portion of the plurality of prizes, wherein only one of the first portion of the plurality of prizes is highlighted at any given point in the cycle to indicate that the one of the first portion of the plurality of prizes is awardable as the first prize.

* * * * *